United States Patent
Barth et al.

(10) Patent No.: US 6,360,775 B1
(45) Date of Patent: Mar. 26, 2002

(54) CAPILLARY FLUID SWITCH WITH ASYMMETRIC BUBBLE CHAMBER

(75) Inventors: Phillip W. Barth; Leslie A. Field, both of Portola Valley; David K. Donald, Mountain View, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/221,655

(22) Filed: Dec. 23, 1998

(51) Int. Cl.$^7$ .................................................. F15C 1/04

(52) U.S. Cl. ....................... 137/828; 137/803; 137/833; 385/17; 385/18

(58) Field of Search ................................ 137/803, 833, 137/828; 385/17, 18

(56) References Cited

U.S. PATENT DOCUMENTS

| | | | |
|---|---|---|---|
| 4,121,884 A | | 10/1978 | Greenwood .............. 360/96.15 |
| 4,494,128 A | * | 1/1985 | Vaught ......................... 347/98 |
| 4,505,539 A | | 3/1985 | Auracher et al. ......... 350/96.15 |
| 4,615,580 A | * | 10/1986 | Mayer ......................... 385/19 |
| 5,181,016 A | | 1/1993 | Lee ............................. 340/788 |
| 5,699,462 A | | 12/1997 | Fouquet ....................... 385/18 |
| 5,730,187 A | | 3/1998 | Howitz ....................... 137/803 |
| 5,777,649 A | * | 7/1998 | Otsuka et al. ................ 347/94 |
| 6,062,681 A | * | 5/2000 | Field et al. .................... 347/65 |
| 6,072,924 A | | 6/2000 | Sato et al. ..................... 385/18 |

OTHER PUBLICATIONS

Kyle Lebouitz, Dorian Liepmann, and Alberto Pisano, "Project Silicon Nitride Shells for Fluid Flow Visualization", Berkeley Sensor & Actuator Center, Mar. 10–11, 1998. (not Published).

John Evans, Dorian Liepmann, Alberto P. Pisano, "Planar Laminar Mixer"; Proceedings IEEE The Tenth Annual International Workshop on Micro Electro Mechanical Systems, Jan. 26–30, 1997; pp. 96–101.

Christopher C. Beatty, "A Cronology of Thermal Ink–Jet Structures"; Solid–State Sensor and Actuator Workshop, South Carolina, Jun. 3–6, 1996, pp. 199–204.

Walter J. Moore, Physical Chemistry, Chapter 11, pp. 476–483, 1997.

L. E. Scriven and C. V. Sternling, "The Marangoni Effects", Nature, Jul. 16, 1960, pp. 186–188.

Makoto Sato, et al.; "Waveguide Optical Switch for *:1 Standby System of Optical Line Terminals"; OFC '98 Technical Digest, pp. 194–195, 1997.

(List continued on next page.)

*Primary Examiner*—A. Michael Chambers

(57) ABSTRACT

A switching device for controlling fluid motion. The device includes a capillary filled with a first fluid into which a wall-confined bubble of a second fluid is introduced to achieve a first switching event. Capillary geometry and wetting properties provide a pressure-related asymmetric energy potential distribution for controlling the flow of the bubble, and the device is called an asymmetric bubble chamber, or ABC. The bubble is initially trapped in an energy potential well, and upon increase of its volume moves from the well into a region of low energy potential to achieve a second switching event. The first switching event may be blocking of a fluid channel or reflection of an optical beam in an optical crosspoint switch, while the second switching event may be unblocking of a fluid channel or restoration of transmission of an optical beam. The increase in bubble volume between the first and second switching events can act as the stroke of a fluidic piston to pump a volume the first fluid within the capillary. The device can be employed to thermally degas a liquid. The use of large-magnitude geometry-related energy potentials permits rapid cyclical operation of the device in a manner resistant to mechanical shock.

40 Claims, 13 Drawing Sheets

OTHER PUBLICATIONS

Makoto Sato, Mitsuiro Makihara, Fusao Shimokawa and Yasuhide Nishida, "Self–Latching Waveguide Optical Switch Based on Thermo–Capillarity", ECOC '97; Sep. 22–25, 199; pp. 73–76.

Makoto Sato, Mitsuiro Makihara, Fusao Shimokawa and Yasuhide Nishida, "Micromechanical Optical Switches Based on Thermocapillary Integrated Wageguide Substrate"; Journal of Lightwave Technology, vol. 17, No. 1, Jan., 1999; pp. 14–18.

* cited by examiner

CAPILLARY FLUID SWITCH WITH ASYMMETRIC BUBBLE CHAMBER

FIELD OF THE INVENTION

The invention relates generally to movement of a bubble of one fluid in another fluid within a capillary, and more particularly to switches for optical signals, to fluid valves, to fluid pumps, and to liquid degassers.

BACKGROUND

Bubbles in capillaries are useful in several respects. In optical devices they possess a different index of refraction than a surrounding liquid and so can reflect or refract optical signals. In addition they can be moved about within capillaries by exploiting temperature-dependent surface tension effects which tend to force bubbles from colder regions to warmer regions, by exploiting geometric effects which tend to squeeze bubbles out of small capillaries into larger capillaries, and by exploiting wetting effects which tend to favor the presence of a first fluid which easily wets a capillary wall over a bubble of a second fluid which does not wet that same wall as well.

Capillary devices that exploit the change in surface tension of a bubble with temperature are said to work by thermocapillarity, also known as the Marangoni effect (see, for example, L. E. Scriven and C. V. Sterling, "The Marangoni Effects," Nature, V 187, p 186 (1960)). An example of recent work published on an optical switching device that exploits thermocapillarity is Makoto Sato, et al, "Waveguide Optical Switch for 8:1 Standby System of Optical Line Terminals," paper WM16, Technical Digest, OFC '98 Optical Fiber Communication Conference and Exhibit, Feb. 22–27, 1998, San Jose Convention Center, San Jose, Calif., pp 194,195. The Marangoni effect is also exploited to control bubble movement for optical switching in the invention "TOTAL INTERNAL REFLECTION OPTICAL SWITCHES EMPLOYING THERMAL ACTIVATION," U.S. Pat. No. 5,699,462. In that patent, for example, the embodiment showed in FIG. 29 therein, in a capillary 304 with a tapered width, a bubble is generated at the resistor 308, and is held in place at that resistor by the Marangoni effect which counteracts the geometry-induced force on the bubble due to the tapered width of the capillary. When heating of the resistor is terminated, the bubble moves from resistor 308 toward the top left of the figure along tapered capillary 304, where movement is generated by geometric forces. Thus the operation of the device in FIG. 29 of that patent depends on an opposing balance between Marangoni forces and geometry-induced forces.

It will be understood from the description of the present invention that forces due to geometric effects can be much larger than forces due to the Marangoni effect. Because of the relative feebleness of the Marangoni effect, the geometric effect designed into the device of FIG. 29 of U.S. Pat. No. 5,699,462 to balance the Marangoni effect must also be feeble and the operation of that device is relatively slow and susceptible to interference from mechanical shock. There still exists a need for a microfluidic device which uses large-magnitude forces to provide rapid and stable optical switching, and the present invention meets that need.

Bubbles are also usefull as valve elements to control fluid flow in capillaries. A bubble can be made to reside at a given position in a capillary by some combination of temperature effects and geometric effects which creates a local energy potential minimum for the bubble, and by blocking or nearly blocking the capillary can then impede the flow of a surrounding fluid. See, for example, John Evans, et al, "Planar Laminar Mixer," Proceedings of the Tenth annual International Workshop on Micro Electro Mechanical Systems, Nagoya, Japan, Jan. 26–30, 1997, IEEE Catalog Number 97CH36021, pp 96–101. However, the Evans et al. paper teaches no technique for removing the bubble from its local energy potential minimum. Devices that do not provide adequate bubble removal can suffer from "vapor lock" if the bubble is composed of gas liberated from dissolved gas in the liquid, because such a bubble will fail to disappear when the heating resistor which creates it is turned off. There still exists a need for a reliable technique for confining a bubble in a channel securely, and when desired, for releasing and removing the bubble from the channel, in a repeatable and efficient manner. As will be seen in detail below, the present invention teaches such a technique.

Bubbles are also useful as pumping elements in capillaries. An expanding bubble in a capillary or chamber can act as a piston, displacing the surrounding fluid and causing it to move in a direction dictated by the capillary geometry. The same work by John Evans, et al, "Planar Laminar Mixer," referenced above, employs an alternately expanding and contracting bubble in a chamber as a piston element. Like the valve described in the same work, the piston bubble can suffer from "vapor lock." There still exists a need for a pump employing a bubble piston which removes that bubble from the pumping chamber when desired, and the present invention teaches such a pump.

SUMMARY

The present invention uses the difference in energy potential associated with a bubble in different regions of a capillary to trap the bubble within a region of the capillary when such trapping is desired, and does so while providing resistance to perturbations, which could lead to undesired changes in state. The difference in energy potential can be geometry-dependent and/or materials-dependent. The present invention also uses difference in energy potential to remove the bubble from the trap when desired, and does so more rapidly than prior art devices. The invention is useful for optical switching, for fluid valving, for fluid pumping, and for liquid degassing.

Operation of the device is as follows. In a capillary containing a first fluid, a wall-confined bubble of a second fluid is introduced into a designed-in trap in the capillary by some means, for example by boiling a liquid constituting the first fluid using a heating resistor to create a bubble of a vapor which constitutes the second fluid. Bubbles can also be introduced using electrical, chemical, electrolytic, pneumatic, hydraulic, optical, inertial, ultrasonic, and microfluidic techniques, including injecting bubbles from a source (e.g., a gas bubble from a gas source). Introduction of the bubble accomplishes a first desired event, such as switching of an optical beam or blocking of a fluid channel. The bubble is trapped because it sits at a local energy potential minimum within the capillary, and moving it would require an input of energy.

Next, the energy of the bubble is increased by, for example, increasing the power input to a heating resistor to introduce more gas, thereby increasing the size of the bubble. As the bubble grows its energy increases, and as it grows it encounters a designed-in spatial asymmetry (geometrical and/or material) in the energy potential of the capillary adjacent to the trap. It tends to grow in the direction of least energy potential. Growth of the bubble can accomplish a second desired event, such as pumping of the volume of the first fluid displaced by the bubble during its growth.

Then, the growing bubble reaches a metastable energy maximum and it encounters a designed-in region of low spatial energy potential within the capillary. Further growth of the bubble causes it to intrude into the region of low spatial energy potential, and the bubble becomes positionally unstable. In a manner analogous to the siphoning of water through a hose from a hillside pond to a lower pond due to gravitational energy potentials, the bubble moves from the trap and flows rapidly into the region of low spatial energy potential. As it moves, it accomplishes a third desired event, such as switching of an optical beam or unblocking of a fluid channel.

In some embodiments, as the bubble leaves the trap in a direction defined as downstream, it pushes downstream some of the first fluid ahead of it and sucks a volume of the first fluid from a direction defined as upstream to refill the volume of the trap.

Because the invention employs designed-in asymmetries in energy potential to accomplish bubble trapping and bubble movement, it is referred to as an asymmetric bubble chamber, or "ABC."

The following terminology is used below to refer to the various spatial regions of the ABC.

The trap volume in which the bubble is initially trapped is called the "gate." The region of low spatial energy potential into which the bubble exits from the gate is called the "drain." The region of relatively higher energy potential between the gate and the drain constitutes a potential barrier and is called the "barrier." The region from which the first fluid enters to refill the gate after the bubble has exited from the gate to the drain is called the "source." In the usual mode of operation of the device in which the first fluid enters from the source, the source is upstream of the gate, the gate is upstream of the barrier, and the barrier is upstream of the drain, where "upstream" and "downstream" refer to the usual direction of flow of the first fluid.

The source has an energy potential for a wall-confined bubble of a second fluid in the first fluid called the "source potential." However, in some embodiments, provided that fluid can refill the gate region, the source may be absent or plugged. For example, a device can have two barriers and one of them can act as the source.

The gate has an energy potential for a wall-confined bubble of a second fluid in the first fluid called the "gate potential" which is less than the source potential.

The barrier has an energy potential for a wall-confined bubble of a second fluid in the first fluid called the "barrier potential" which is higher than the gate potential but lower than the source potential.

The drain has an energy potential for a wall-confined bubble of a second fluid in the first fluid called the "drain potential" which is less than the gate potential.

From the above description of relationships among the four energy potential regions it will be appreciated that the gate has a region of local energy potential minimum called a "potential well."

Prior-art microfluidic switches employing a bubble in a capillary tended to be unstable and the speed of operation tended to be slow. In the present invention a bubble is initially trapped in a potential well, but then can overcome a substantial energy barrier and rapidly move outside the well. Thus, a system with a switch, valve, or pump of the present invention is stable and is resistant to unintended perturbation by vibration or temperature, but can also operate rapidly.

It will be appreciated that the invention can be operated in cycles, where the speed of operation is limited first by the speed at which a bubble can be introduced into the gate, and second by the speed at which a bubble can be moved from the gate to the drain.

Moreover, this operation need not be accomplished by the mechanical motion of solid parts. Rather, the energy potentials of the source, gate, barrier, and drain are defined by the geometry of the channel, or by the materials composition of the channel plus the first fluid plus the second fluid, or by a combination of geometry and materials composition. The invention allows bubbles to be introduced and moved entirely by fluidic means which, for example, can be controlled thermally by electrical heating.

In one embodiment of the present invention a capillary is filled with a liquid such as water and the walls of the capillary are a hydrophilic material such as glass. A steam bubble is introduced into the gate by using a small electrical resistor to boil the water. The bubble is large enough to substantially fill the gate, and its introduction causes a first switching event. If the capillary is part of an optical crosspoint switch such as that described in U.S. Pat. No. 5,699,462, the presence of the bubble causes a first optical switching event. If the capillary is part of a fluid flow system, the presence of the bubble acts to block fluid flow within the capillary and so causes a first fluidic switching event. In either case the local energy potential minimum within the gate acts to trap the bubble, even in the presence of disturbances such as mechanical acceleration or liquid pressure fluctuations. In such a hydrophilic setting the gate is a chamber of larger width than the adjacent source and barrier portions of the capillary.

In a second switching event for the same embodiment of the invention, which returns the system to its initial state, the volume of the bubble is increased, by increasing the heating power to the resistor, so that it fills the volume of the gate plus the volume of the barrier and begins to intrude into the volume of the drain. The enlarged bubble is then siphoned by surface tension forces from the gate, through an adjacent narrowing of the capillary (which is the barrier in a hydrophilic setting), and into an even wider portion of the capillary (which comprises the drain in a hydrophilic setting). At the same time, liquid refills the gate from upstream through a narrow portion of the capillary (which is the source in a hydrophilic setting).

BRIEF DESCRIPTION OF THE DRAWINGS

The following figures are included to better illustrate the embodiments of the apparatus and technique of the present invention.

DETAILED DESCRIPTION

Figure 1:
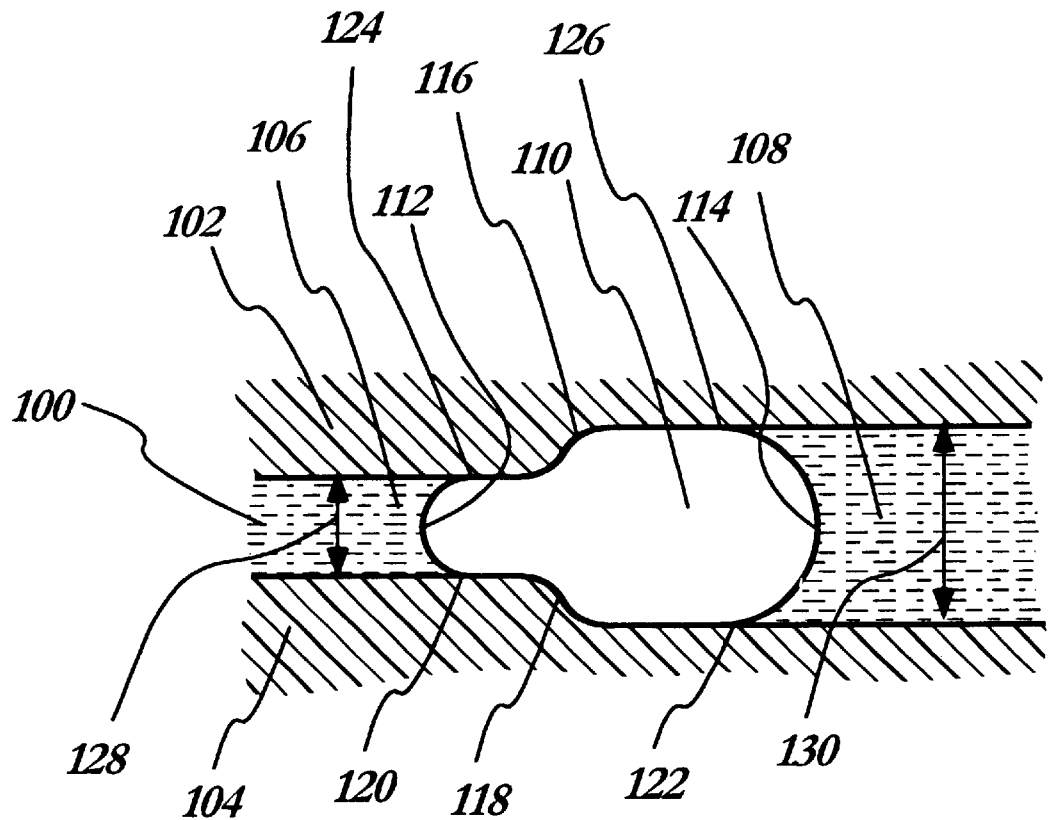
FIG. 1 is a schematic view showing a bubble in a capillary with two different radii of curvature at different free surfaces of the bubble.

The physics of bubble movement in capillaries must be understood in some detail in order to understand the mode of operation of the present invention. This physics is presented below.

A capillary is defined as a channel of small dimensions in which forces due to fluid surface tension and wetting, called "capillary forces," are comparable to or predominate over forces due to the density of the fluid in a gravitational field or other acceleration field. A "microfluidic" device is a device of small linear dimensions in which capillary forces typically play an important role.

The walls of a capillary can act to confine a bubble of a second fluid within a first fluid and to control the directions in which the bubble can move. The first fluid and second fluid may be either gas or liquid, although both the first and second fluids cannot be gas simultaneously because a mixture of two gases cannot sustain a bubble surface between the two gases. The first fluid and second fluid may be the same substance in different physical form; for example, the first fluid can be liquid water while the second liquid is water vapor.

A bubble within a capillary is said to be "wall-confined" if it is large enough to touch the walls of the capillary on two substantially opposite sides. For example, in one extreme case the capillary can be a long tube of circular cross section. An air bubble in water which touches the tube walls around its entire periphery while being free to move along the length of the tube is wall-confined. If the bubble becomes so small that it touches the capillary walls along less than 180 angular degrees of its periphery, then it is no longer wall-confined.

In another extreme case, the capillary can include two nearly-parallel plates of glass. The first fluid can be water, and the wall-confined bubble can be a flattened disk of air within the water between the two plates. The bubble is free to move in two dimensions between the plates. If the bubble becomes so small that it only touches one of the plates, then it is no longer wall-confined.

Between the above two extreme cases are capillaries of many cross-sectional shapes, such as those of square or rectangular cross section. A bubble in such a capillary is wall-confined if less than 180 contiguous angular degrees of its cross-sectional periphery is free of contact with the capillary walls.

The term "wall-confined" has previously been used in high-energy plasma physics, but in that field describes a different concept. The concept of wall confinement of a bubble in a capillary presented herein was developed in the course of describing the present invention. Those portions of a bubble in a capillary not in contact which the capillary walls are called the "free surfaces" of the bubble. Those portions of the bubble in contact with solid walls are called "bounded surfaces" of the bubble.

If a wall-confined bubble encounters a condition where it is no longer free to move in any direction in the capillary, it is said to be "trapped" and the volume of the capillary in which the bubble is trapped is called a "trap." A trapped bubble may nevertheless have free surfaces.

Between a fluid bubble such as a gas bubble and its fluid surroundings such as a liquid, there exists an interfacial surface which can be characterized by a radius of curvature r and a surface tension $\sigma(T)$, where T is temperature and so $\sigma$ is a function of temperature T. Across this surface there exists a pressure difference given by $P=2\sigma(T)/r$ (see, for example, Physical Chemistry, Walter J. Moore, fourth edition, Prentice-Hall, Englewood Cliffs, N.J., page 478).

The bubble surface can be manipulated by varying one or more of the pressure difference, the surface tension, the surface radius of curvature, and the wetting properties of the capillary walls.

Good wetting and poor wetting can be quantified in terms of equilibrium contact angles of fluid against surface. For example, a drop of water in air contacting a clean plate of silicon dioxide glass has a very low equilibrium contact angle taken within the water, and the glass surface is said to be well wetted. However, the contact angle taken within the air is large, and so the air is considered to "wet" poorly in comparison to water. On the other hand, a drop of mercury in air resting on a clean glass plate has a very high equilibrium contact angle taken within the mercury droplet. The glass surface is said to be poorly wetted by the mercury, and the air is considered to wet well in comparison to the mercury.

For aqueous liquids good wetting is called hydrophilicity and is characterized by an equilibrium contact angle less than ninety degrees; the wetted material is described as hydrophilic. Similarly, poor wetting is called hydrophobicity and is characterized by an equilibrium contact angle greater than ninety degrees; the wetted material is described as hydrophobic. The terms hydrophilic and hydrophobic can be generalized to "fluiphilic" and "fluiphobic" to describe the equilibrium contact angle taken within any fluid where it meets a second immiscible fluid at a solid wall.

If a bubble surface intersects a wall of solid material, the equilibrium contact angles depend on the wetting properties of that wall for both the fluid surrounding the bubble, which for convenience can be called "fluid 1," and the fluid within the bubble, which can be called "fluid 2." If the angle, taken for example within fluid 1, becomes greater or less than the equilibrium contact angle, the bubble will tend to move and exhibit an "advancing contact angle" or a "receding contact angle."

The pressure difference across a bubble's surface is inversely proportional to the radius of curvature of that surface. As an example of the magnitude of the pressure difference, boiling water produces bubbles at temperatures of roughly 100 degrees C and above. For water at 100 degrees C the surface tension of an air bubble is equal to 59 milliNewtons per meter (mN/m). If an air bubble in that water has a radius of 25 micrometers (25 $\mu$m), then its internal pressure relative to the external water is equal to P=2 (59 mN/m)/25 $\mu$m)=4.72 kiloPascals (kPa), equal to the pressure exerted by a column of water approximately 18 inches (46 cm) tall. If the radius of the bubble is halved to 12.5 $\mu$m, then the internal pressure doubles to 9.44 kPa.

The pressure difference also depends directly on the bubble's surface tension, and that surface tension varies with temperature. For example, the surface tension of liquid water in air decreases by approximately 22% as temperature varies from 0 C to 100 C, or 0.22% per degree C.

From the above example of air bubbles in water it can be appreciated that even for a relatively large temperature change, the change in the pressure due to the temperature dependence of surface tension can be small relative to changes in pressure due to changing the radius of curvature. Controlling the radius of curvature is thus a relatively powerful mechanism for controlling a bubble, and is exploited in the present invention.

Like any fluid, bubbles tend to flow from a region of higher energy potential to a region of lower energy potential. To understand this concept it is necessary to understand a little about both energy and energy potential.

The introduction of a bubble into a capillary includes displacing a portion of a first fluid and replacing it with a volume of a second fluid, where for example the first fluid may be water and the second fluid may be steam introduced through generation by boiling the water. Introducing a wall-confined bubble into a capillary requires more energy than introducing the same volume of bubble where it is not wall-confined.

The minimum energy required to introduce a wall-confined bubble of a given volume into a given portion of a device is determined by the spatially-dependent energy potential, called herein the "energy potential," or more simply the "potential" of that portion of the device. For example, in a given portion of a capillary it may be necessary to provide x Joules of energy per cubic centimeter of bubble volume to introduce a bubble. The quantity x is the energy potential. If a bubble within that region has a volume of y cubic centimeters, then the energy require to introduce that bubble is just x multiplied by y and is given in Joules.

Assume that at an adjacent but different location within the same capillary the energy potential has a value of z Joules of energy per cubic centimeter of bubble volume. Then for the same bubble volume y, the bubble energy in this second region is z multiplied by y and is again given in Joules. If z is less than x, then the bubble will prefer to be in the second location rather than the first because its overall energy is less in the second location than in the first. Thus it can be seen that the bubble seeks the region of lowest energy potential.

The energy contained within a bubble due to pressure is just the internal pressure of the bubble with respect to its surroundings multiplied by the volume of the bubble. Thus, the pressure is one measure of the energy potential, and this type of energy potential can be called a "pressure energy potential." Other factors such as gravity and temperature can contribute their own energy potentials.

The energy potential of a region for a wall-confined bubble in a fluid can be influenced both by geometry and by temperature. For example, for a bubble of gas within a liquid which is fluiphilic to the capillary walls, narrow capillaries have a higher energy potential than wider capillaries, and cooler regions have a higher energy potential than warmer regions.

The pressure difference between two fluids across the interfacial surface of a fluid bubble is inversely proportional to the radius of curvature of the free surface of the bubble. The present invention exploits this relationship in a capillary system. For a wall-confined bubble of a second fluid within a first fluid, where the bubble has two free-surface ends in a capillary of non-constant cross section, the radii of curvature at the two free ends of the bubble can be different. That difference in radii corresponds to a pressure difference between the two regions of the first fluid separated by the bubble, and that pressure difference can either move the bubble or hold it in place against an applied pressure as one desires.

FIG. 1 illustrates these principles but is not an embodiment of the present invention. The figure is a sectional view through a capillary of variable width which contains a wall-confined bubble of a second fluid in a first fluid which easily wets the walls of the capillary. The bubble tends to flow from the narrow portion of the capillary to the wider portion of the capillary unless an external pressure is applied to the wide portion of the capillary to force the bubble into the narrow portion.

The physics which describe the forces on such wall-confined bubbles in capillaries are as follows.

For any point on a free surface of a bubble it is possible to define a local radius of curvature in terms of two principal radii of curvature: a maximum local radius of curvature $r_{max}$ taken along one direction at that point, and a minimum local radius of curvature $r_{min}$ taken along a direction perpendicular to the direction of $r_{max}$. The magnitude of the local radius of curvature $r_{local}$ is then found from the equation $$1/r_{local}=(1/r_{max}+1/r_{min})/2 \qquad \text{Eq. 1}$$

For a wall-confined bubble of a second fluid at rest within a first fluid, each free surface of the bubble has a characteristic radius of curvature which is defined by the surface tension, $\sigma$, of the interface between the two fluids, by the dimensions of the capillary, and by the wall-wetting characteristics of the dual-fluid system. This characteristic radius is called the "equilibrium free-surface radius," $r_{f,e}$.

The equilibrium free-surface radius, $r_{f,e}$, is conceptually different from the well-known "effective hydraulic radius," $r_{h,eff}$, of a capillary. The effective hydraulic radius is the radius of a hypothetical capillary with a circular cross section that has the same resistance to fluid flow as an actual capillary being considered. Thus the effective hydraulic radius pertains to the capillary's resistance to fluid flow and is a property of the capillary geometry only. The equilibrium free-surface radius, in contrast, is a property of the capillary geometry, plus the properties of both the first and second fluids, plus the materials properties of the capillary walls. The equilibrium free surface radius does not concern resistance to fluid flow, but rather concerns the shape a bubble surface at rest would take at a particular location.

For clarity, it simplifies discussion to relate a local $r_{f,e}$ only to local capillary geometry, and that simplified route is taken in much of the discussion below with the understanding that the underlying relationship can be more complex. If the equilibrium wetting angle of the first fluid against the capillary walls is zero at the interface between the first fluid and the bubble, then $r_{f,e}$ is determined only by the geometry of the capillary. In this case, for a capillary with a rectangular cross section of width w and height h, $$1/r_{f,e} = \{1/(w/2)+1/(h/2)\}/2 = (1/w+1/h) \qquad \text{Eq. 2}$$

The pressure difference, $\Delta P$, across the bubble wall is then equal to $$\Delta P_{f,e} = 2\sigma/r_{f,e} = 2\sigma(1/w+1/h) \qquad \text{Eq. 3}$$

The above $\Delta P_{f,e}$ is called the "equilibrium free surface differential pressure," a term newly developed to describe the mode of operation of the present invention. The pressure difference, $\Delta P_{f,e}$, is also the pressure difference between the bubble pressure, $P_{bubble}$, and the adjacent pressure of the first fluid, $P_{f1}$:

$$\Delta P_{f,e} = P_{bubble} - P_{f1} = 2\sigma/r_{f,e} \qquad \text{Eq. 4}$$

In FIG. 1 a first fluid (fluid 1) resides in a capillary 100 defined by walls 102 and 104 which are perpendicular to the plane of the sectional drawing and by two other walls parallel to the plane of the sectional drawing. Fluid 1 is divided into two regions 106 and 108. A second fluid (fluid 2) is immiscible in fluid 1 and forms a bubble 110 with free surfaces 112 and 114 and with bounded surfaces 116 and 118. Surfaces 112 and 114 have different equilibrium free-surface radii, $r_{f,e}$. Fluid 1 can be a liquid whereas fluid 2 can be a gas (e.g., an air bubble in water), but other arrangements are possible (e.g., fluid 2 can be liquid mercury, which can contain a bubble, whereas fluid 1 can be air). For the purposes of illustration, FIG. 1 shows an equilibrium wetting angle of zero for fluid 1 where it touches the capillary walls at locations 120, 122, 124, and 126.

In FIG. 1, region 106 has a rectangular cross section with a width, $w_1$, designated by dimension line 128, and a height, h, perpendicular to the plane of the page. Fluid 1 in region 106 has a pressure of $P_{f1}$ and the pressure across the free surface 112 between fluid 1 and fluid 2 is $$\Delta P_1 = P_{bubble} - P_{f1} = 2\sigma/r_1 \qquad \text{Eq. 5}$$

where $r_1$ is the equilibrium free surface radius ($r_{f,e}$) of the free surface 112 and is defined by the relation $$1/r_1 = 1/w_1 + 1/h \qquad \text{Eq. 6}$$

so that $\Delta P_1$ becomes:

$$\Delta P_1 = P_{bubble} - P_{f1} = 2\sigma/r_1 = 2\sigma(1/w_1+1/h) \qquad \text{Eq. 7}$$

Also in FIG. 1, region 108 has a rectangular cross section with a width, $w_2$, designated by dimension line 130, and a height, h, perpendicular to the plane of the page which is equal to the height of region 106. Fluid 1 in region 108 has a pressure $P_{f2}$. The pressure difference across free surface 114 is $$\Delta P_2 = P_{bubble} - P_{f2} \times 2\sigma(1/w_2+1/h) \text{ Eq. 8}$$

For a uniform temperature and when the bubble is not moving, the pressure difference between regions 106 and 108 is then equal to:

$$\Delta P_{f1} - \Delta P_{f2} = 2\sigma(1/w_1 - 1/w_2) \qquad \text{Eq. 9}$$

Thus for a rectangular capillary of uniform height but variable width, the capillary height does not influence the pressure difference between the two regions 106 and 108.

The foregoing illustrates that, assuming there is no difference in temperature and no movement, a pressure exists to urge the bubble from a smaller channel to a larger channel to which the smaller channel is connected. Such a pressure will also tend to prevent the bubble from going into a narrower capillary from a wider capillary.

Figure 2:
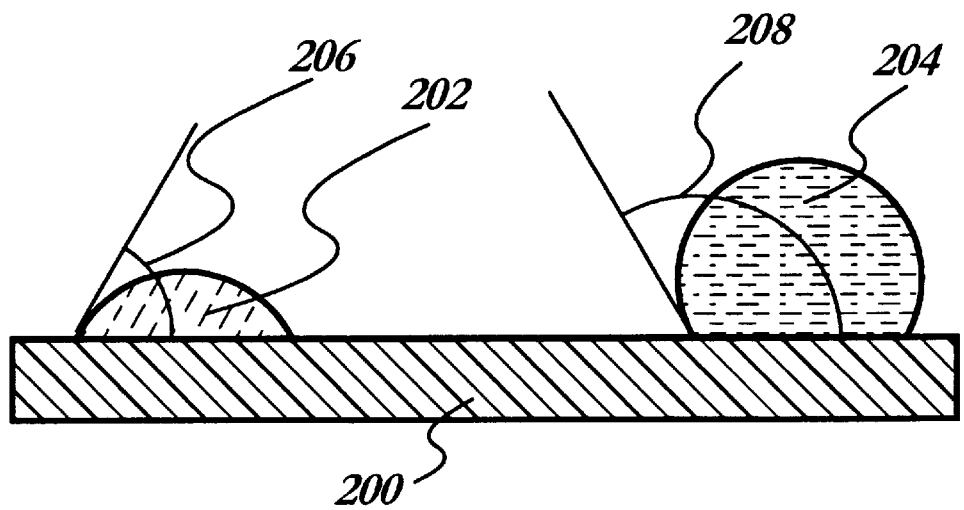
FIG. 2 is a sectional view showing liquid drops on a surface illustrating good surface wetting and poor surface wetting.

Not all fluids wet the walls of a capillary well. FIG. 2 illustrates cases of good wetting and poor wetting for two fluids on a surface. On the surface of a material 200 are placed fluid volumes 202 and 204. Typically such fluid volumes may be liquid in an ambient surrounding of air, but they can also be liquid in an ambient surrounding of liquid or gas in an ambient surrounding of liquid. For the purposes of discussion it will be assumed that volumes 202 and 204 are droplets of liquid in air. Droplet 202 is characterized by an equilibrium contact angle, $\theta_e$, designated as feature 206 and taken within the droplet at the location where it meets the surface of material 200; because this angle is less than ninety degrees the surface of material 200 is said to be well-wetted by droplet 202. Droplet 204, on the other hand, is characterized by an equilibrium contact angle, $\theta_e$, designated as feature 208 and taken within the droplet; because this angle is greater than ninety degrees the surface of material 200 is said to be poorly wetted by droplet 204.

For the descriptions below the generalized terms "fluiphilic" and "fluiphobic" refer to the equilibrium wetting angle taken within fluid 1 where it meets the capillary wall at a bubble surface with fluid 2. The capillary wall is called fluiphilic if the equilibrium contact angle taken within fluid 1 is less than ninety degrees and is called fluiphobic if the equilibrium contact angle taken within fluid 1 is greater than ninety degrees.

The present invention employs large-magnitude geometry-related energy potentials rather than the small-magnitude temperature-related energy potentials employed in prior-art devices. As an example of the magnitude of energy potentials in a fluiphilic (and hydrophilic) system, consider water at 100 degrees C in a glass capillary of circular cross section with a radius of 25 $\mu$m and with perfectly hydrophilic walls. A wall-confined air bubble in this capillary has a radius of curvature of 25 $\mu$m, and as calculated above has in internal pressure 4.72 kiloPascals (kPa) higher than the surrounding water.

If an attempt is made to squeeze this 25 $\mu$m radius bubble into a capillary of circular cross section 5 $\mu$m in radius with perfectly hydrophilic walls, then the bubble's equilibrium free surface radius ($r_{f,e}$) must decrease to 5 $\mu$m and its internal pressure must be increased by a factor of 5 to 23.6 kPa, equal to the pressure exerted by a column of water 90 inches (230 cm) tall, roughly 1/4 of atmospheric pressure. The difference in the radii of curvature at the two ends of the bubble as it is being squeezed into the 5 $\mu$m radius capillary creates a resisting pressure difference of $\Delta P$=(23.6 kPa–4.72 kPa)=18.9 kPa, 400% as large as the original pressure within the bubble of 25 $\mu$m radius.

In contrast, the magnitude of pressure differences due to the change in surface tension of water at atmospheric pressure can never be more than 22%, because the surface tension of water decreases only 22% from freezing to boiling. This change in surface tension is responsible for the Marangoni effect as can be appreciated from Eq. 4 above. In practice, it is difficult to sustain a temperature difference of more than 10 degrees C across a small bubble because thermal conduction tends to equalize temperature across the bubble, and so it is difficult to create a pressure difference of more than 2.2% using the Marangoni effect.

Thus, employing geometry-related energy potentials provides advantages on the order of $(400\%/2.2\%) \approx 18,000\%$ in pressure, force, and speed over prior techniques of bubble control based on the Marangoni effect alone, or based on opposing the Marangoni effect against a geometric effect. The present invention exploits these geometric effects plus wetting effects to achieve bubble trapping and rapid bubble movement as illustrated in FIGS. 3–6.

The present invention may be used for controlling bubble movement in conjunction with optical switching of the prior invention "TOTAL INTERNAL REFLECTION OPTICAL SWITCHES EMPLOYING THERMAL ACTIVATION," U.S. Pat. No. 5,699,462, which is incorporated by reference in its entirety herein. U.S. Pat. No. 5,699,462 describes the use of electrical resistors to control bubble movement in either capillaries of uniform width or capillaries of varying dimensions for optical switching purposes. Briefly stated, in such an optical switch device, the switching element has a transmitting state and a reflecting state. In the transmitting state, an index-matching liquid fills a gap placed at the intersection of two optical waveguides and light can pass from a first waveguide segment to a second waveguide segment across the gap. In the reflecting state, a bubble introduced into the gap displaces the index-matching fluid and creates an index mismatch in the gap so that light is reflected from the first waveguide segment into a third waveguide segment, and is prevented from passing from the first waveguide segment to the second waveguide segment. In U.S. Pat. No. 5,699,462 bubble movement is controlled either by the Marangoni effect alone or by balancing the Marangoni effect against geometric effects which are necessarily of low magnitude in order to achieve such balance.

Figure 3A:
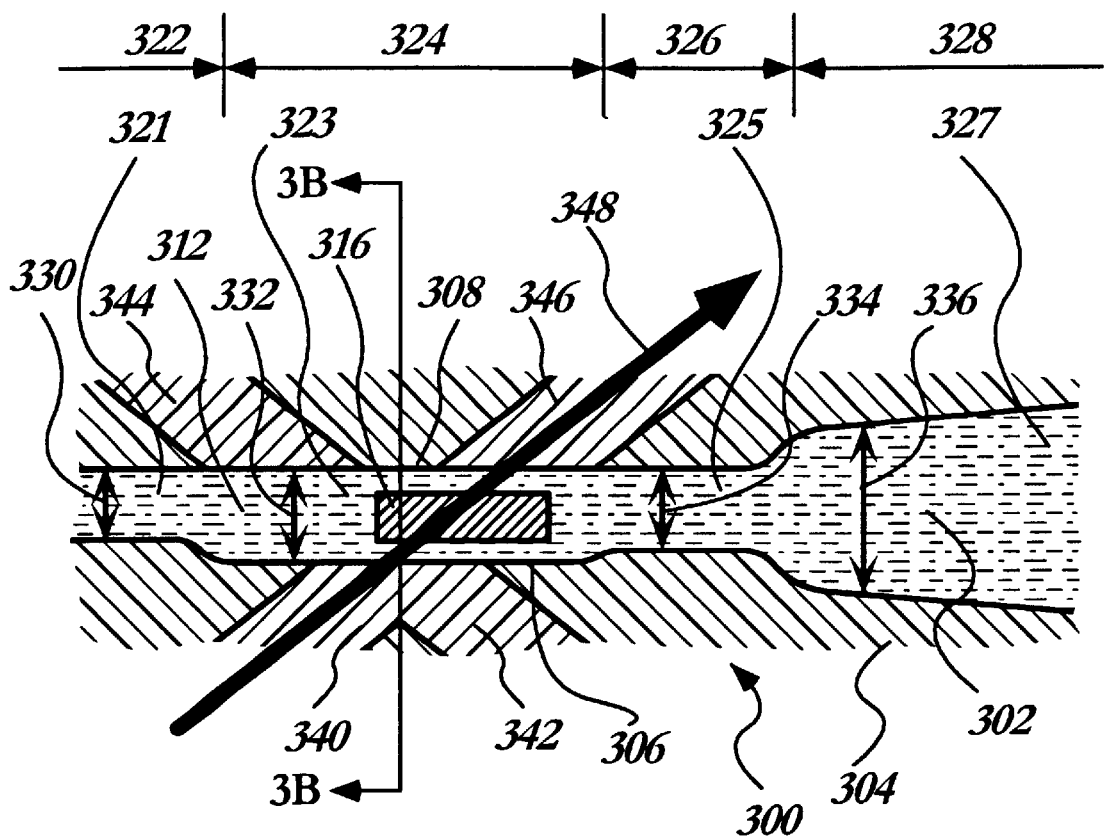
FIG. 3A shows a plan sectional view of an embodiment of the present invention for use in optical switching.
Figure 3B:
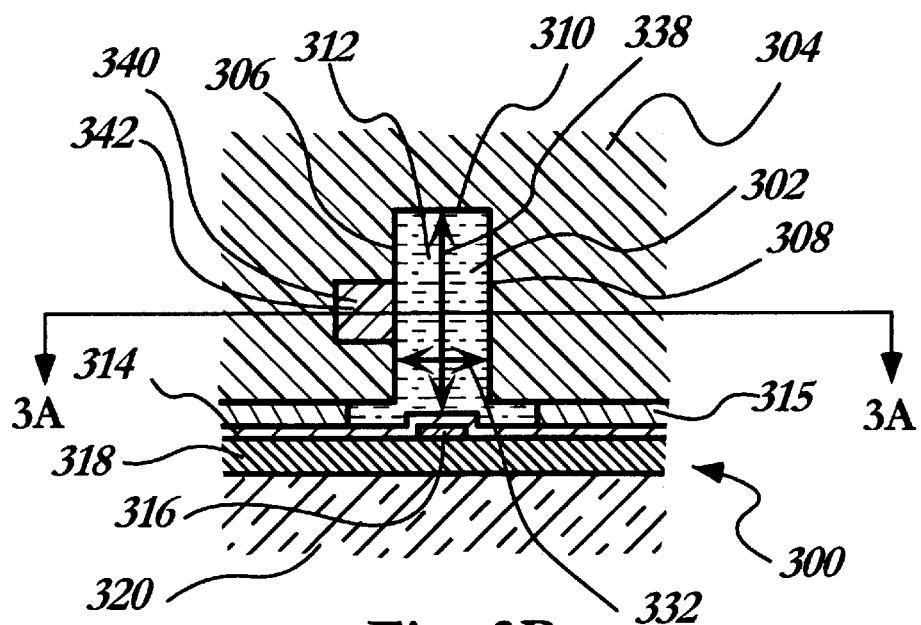
FIG. 3B shows a sectional view of the embodiment of FIG. 3A.

FIG. 3A and FIG. 3B show an embodiment 300 of the present invention used for optical switching purposes similar to that of U.S. Pat. No. 5,699,462, but with the advantages in pressure, force, speed, and acceleration resistance of the present invention due to exploiting high-magnitude geometry-related forces. Embodiment 300 is intended primarily for optical switching purposes but also exhibits fluid valving and fluid pumping characteristics which are advantageous capabilities of the present invention.

FIG. 3A is a sectional view as indicated in FIG. 3B looking perpendicular to a major surface of an embodiment 300 of the present invention used for optical switching as per U.S. Pat. No. 5,699,462 and incorporating the features of the present invention, and FIG. 3B is a sectional view as indicated in FIG. 3A looking parallel to a major surface of the same embodiment. In FIG. 3A and FIG. 3B, only a volume 302 of fluid 1 is present and no bubble of fluid 2 is present.

Material 304 is the cladding portion of a planar optical waveguide array, and it includes the side walls 306 and 308 and roof 310 of a capillary 312 of substantially rectangular cross section, while layer 314 is an electrical insulating layer such as silicon carbide which defines the floor of the capillary. Layer 314 provides electrical insulation over electrical heating resistor 316 which sits beneath layer 314 adjacent to the gate region.

Material 315 is a deformable and adhesive polymer which bonds the waveguide array material 304 to the underlying layer 314. Layer 318 beneath resistor 316 is an electrically insulating and thermally insulating layer such as silicon dioxide. Substrate 320 provides mechanical support and may be a thermally conducting material such as silicon to maximize speed of operation of the device.

In this embodiment, capillary 312 includes four regions 321, 323, 325, and 327 designated by dimension lines 322, 324, 326, and 328 above the drawing of FIG. 3A.

Dimension 322 designates the length $L_{source}$ of the source region 321. Source region 321 extends out of the field of view of the drawing and connects to an inlet reservoir, not shown, of fluid 1, where preferably the inlet reservoir has a low hydraulic resistance.

Dimension 324 designates the length $L_{gate}$ of the gate region 323.

Dimension 326 designates the length $L_{barrier}$ of the barrier region 325.

Dimension 328 designates the length $L_{drain}$ of the drain region 327. Drain region 327 extends out of the field of view of the drawing and connects to an outlet reservoir, not shown, of fluid 1, where preferably the outlet reservoir has a low hydraulic resistance.

The source 321 has a width, $w_{source}$, designated by dimension line 330. The gate 323 has a width, $w_{gate}$, designated by dimension line 332. The barrier 325 has a width, $w_{barrier}$, designated by dimension line 334. The drain 327 has a width, $w_{drain}$, designated by dimension line 336, and which in this embodiment increases with distance from the barrier. The relationship between the various widths is given by $$w_{source} < w_{barrier} < w_{gate} < w_{drain} \qquad \text{Eq. 10}$$

In this embodiment, for the sake of simplicity of construction, the height h of the capillary is uniform and is designated by dimension line 338 in FIG. 3B. It is to be understood that the height of the capillary in the various regions of the capillary need not be uniform as long as the cross-sectional areas of the regions differ to result in the desired differences in energy potentials. In the case where the capillary having the source, gate, barrier, and drain regions is used for switching optical signals that propagate in a generally planar waveguide array, it is preferred that the walls of the capillary which the light impinges upon and exits from are flat and perpendicular to the plane in which the optical signals propagate.

Present in FIG. 3 are optical waveguide core regions 340, 342, 344, and 346, and optical signal 348. In FIG. 3B the intersecting portions of waveguide core regions 340 and 342 are labeled as one object.

Optical signal 348 enters the gate region 324 from core region 340, transits across the gate region, and exits through core region 346. When fluid 1 occupying volume 302 is well matched in index of refraction to the material of the waveguide core regions, the optical signal suffers little loss.

Figure 4A:
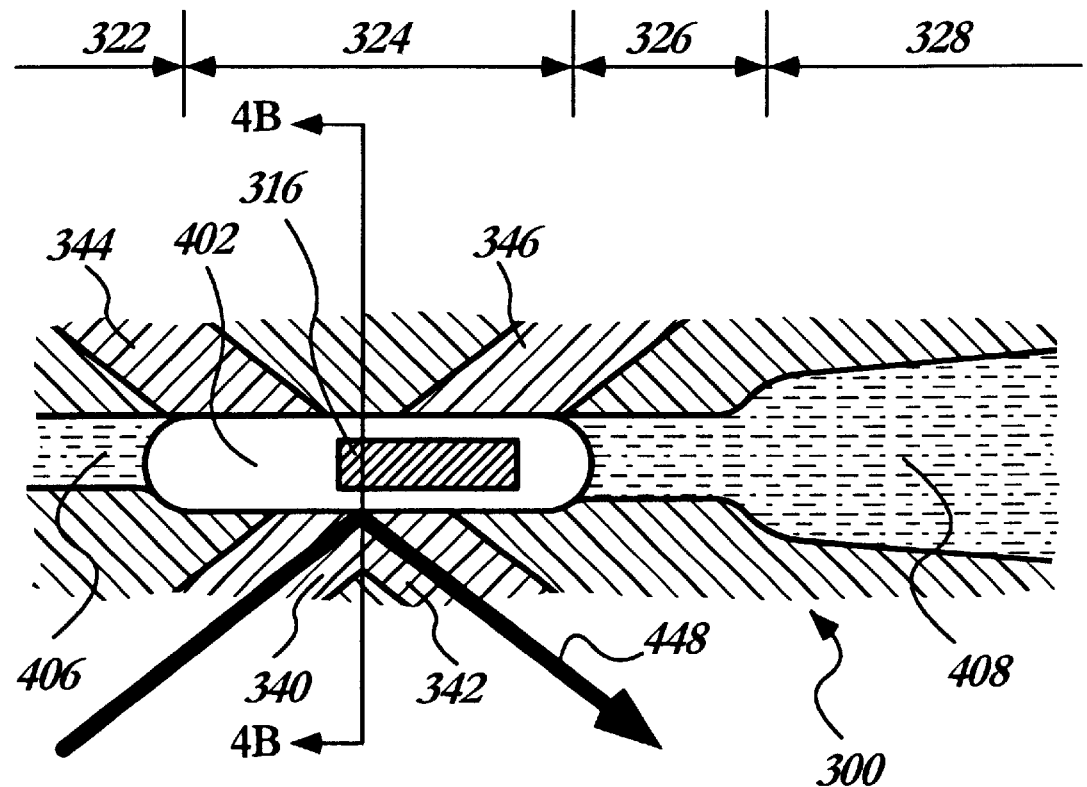
FIGS. 4A and 4B show the embodiment of FIG. 3A and FIG. 3B when a bubble is present.

FIG. 4A depicts the same view as FIG. 3A of the same embodiment of the invention, but in which a bubble 402 of fluid 2 has been introduced. In this embodiment fluid 2 is vapor produced by boiling fluid 1 which is a liquid. Boiling is accomplished by electrically heating resistor 316. The electrical connections to the resistor are not shown but are obvious to practitioners of silicon fabrication technology.

Figure 4B:
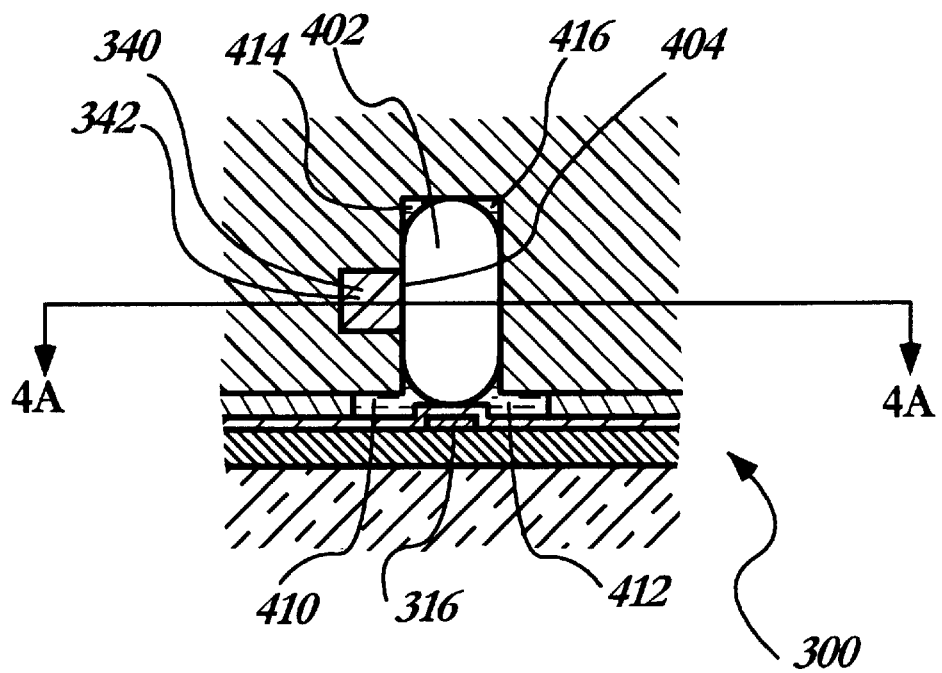

FIG. 4B depicts the sectional view designated in FIG. 4A and is the same as FIG. 3B except that bubble 402 has been introduced. The bubble resides at a local minimum in energy determined by the width $w_{gate}$ of the gate region given in FIG. 3A by dimension line 332.

Because the bubble present in FIG. 4 is poorly matched in index of refraction to the adjacent waveguide core regions 340, 342, 344, and 346, optical signal 448 is reflected off of interface 404 between the bubble 402 and waveguide core regions 340 and 342. In contrast to optical signal 348 which passes through the gate region and exits through waveguide core region 346, optical signal 448 is reflected and exits through waveguide core region 342. This difference between signals 348 and 448, due to the presence of bubble 402, is considered as the desired first switching event of this embodiment of the invention.

It should be noted that in addition to achieving the primary purpose of optical switching in the present embodiment, the presence of bubble 402 acts to block the flow of fluid 1 between regions 406 and 408 in FIG. 4A. When bubble 402 is present, fluid 1 can only flow through the narrow gaps 410, 412, 414, and 416 in FIG. 4B. It is well known that the resistance to fluid flow of a channel varies as the fourth power of the effective hydraulic radius of that channel. Gaps 410, 412, 414, and 416 constitute "blow-by" paths through which fluid 1 can pass, but these paths have much smaller effective hydraulic radii than the capillary does when no bubble is present, and the fluid resistance of these blow-by paths is very high, so that bubble 402 can be seen to form a very effective plug. The embodiment shown thus can also serve as a fluid valve for flow between regions 406 and 408.

The inequality of Eq. 10 is key to the desired operation of the device in this generally fluiphilic embodiment. Using Eq. 10 in conjunction with Eq. 2 above it can be appreciated that $$r_{f,e,source} < r_{f,e,barrier} < r_{f,e,gate} < r_{f,e,drain} \qquad \text{Eq. 11}$$

Eq. 11 can be used in conjunction with Eq. 4 above to calculate a characteristic equilibrium free surface differential pressure which would be required to introduce a wall-confined bubble into each region of the device of FIGS. 3 and 4.

$$\Delta P_{f,e,source} > \Delta P_{f,e,barrier} > \Delta P_{f,e,gate} > \Delta P_{f,e,drain} \qquad \text{Eq. 12}$$

Each term in Eq. 12 denotes a differential pressure within a wall-confined bubble of fluid 2 relative to fluid 1. Because the direction of curvature of the bubble is away from fluid 1 and toward fluid 2, each term in Eq. 12 denotes a pressure within fluid 2 greater than that in fluid 1.

As noted above, pressure is a measure of energy potential. If other sources of energy potential such as gravity are ignored, the pressure ordering given by Eq. 12 can be used to define energy potential differences between the four regions by subtracting one differential pressure from another. Such considerations lead to an ordering of the energy potentials in the four regions as follows:

$$\Pi_{source} > \Pi_{barrier} > \Pi_{gate} > \Pi_{drain} \qquad \text{Eq. 13}$$

In Eq. 13 the greek symbol Π(capital "pi") is chosen to designate energy potential. If the gate is chosen as the reference point at which energy potential is defined to be zero, then for example $\Pi_{source} = \Delta P_{f,e,source} - \Delta P_{f,e,gate}$.

Eq. 13 defines the energy potential relationships necessary to the operation of the present invention. While Eq. 13 has been derived with respect to a specific embodiment, it is a general result which applies to all embodiments of the present invention, and is in fact one of the starting points from which the present invention was conceived.

Figure 5:
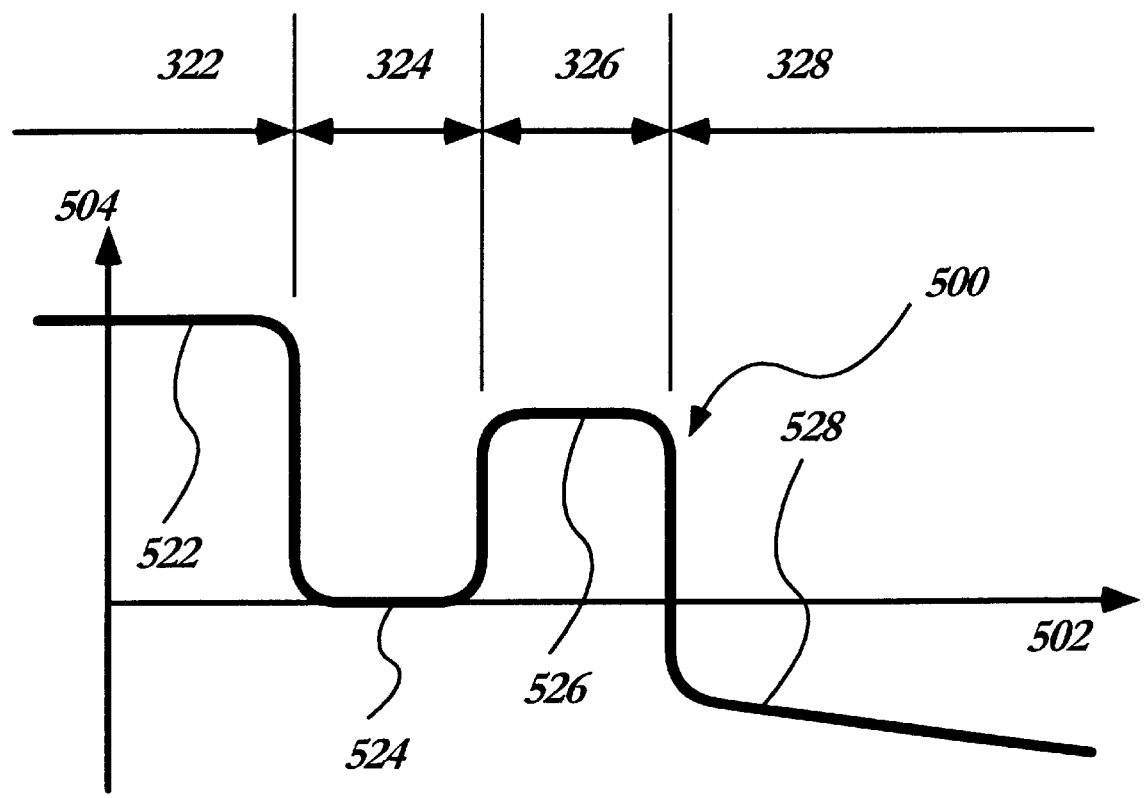
FIG. 5 is a schematic depiction of the energy potentials in the various regions of the embodiment of FIGS. 3 and 4.

FIG. 5 depicts the energy potential distribution 500 for the embodiment of FIG. 3 and FIG. 4 as given by Eq. 13. Axis 502 is distance along the capillary channel, and axis 504 is energy potential for a wall-confined bubble in that channel. Dimension lines 322, 324, 326, and 328 correspond to those in FIG. 3. In each region, the energy required to introduce a wall-confined bubble of fluid 2 in fluid 1 is given by multiplying the pressure difference between the two fluids by the volume of the bubble, and the energy potential is just the differential bubble pressure as given by Eq. 7. Energy potential 522 is $\Pi_{source}$, energy potential 524 is $\Pi_{gate}$, energy potential 526 is $\Pi_{barrier}$, and energy potential 528 is $\Pi_{drain}$. The zero point of axis 504 is arbitrarily chosen so than $\Pi_{gate} = 0$.

It will be appreciated that, since gate potential 524, $\Pi_{gate}$, is less than either of the surrounding energy potentials (i.e., source potential 522 and barrier potential 526), the gate region constitutes a potential well. It will also be appreciated that, if enough energy is added to raise a bubble to energy potential level 526, that it will then tend to flow downhill in energy potential, or equivalently downhill in pressure, in the direction of drain potential 528.

In FIG. 5 the energy potential 528, $\Pi_{drain}$, decreases with distance from the barrier region 326, which as will be seen below is advantageous for rapid switching but is not necessary to the basic operation of the invention. The invention would function, though not as well, if the energy potential were constant with distance in the drain region.

The foregoing provides the background necessary to understand the time evolution of the operation of the present invention as illustrated in FIG. 6.

FIGS. 6A–F are sectional views looking perpendicular to a major surface of an embodiment of the present invention used for optical switching. This embodiment 300 is the same as that presented in FIGS. 3 and 4, and features numbered in the range of 300–499 are the same as those in FIGS. 3 and 4.

Figure 6A:
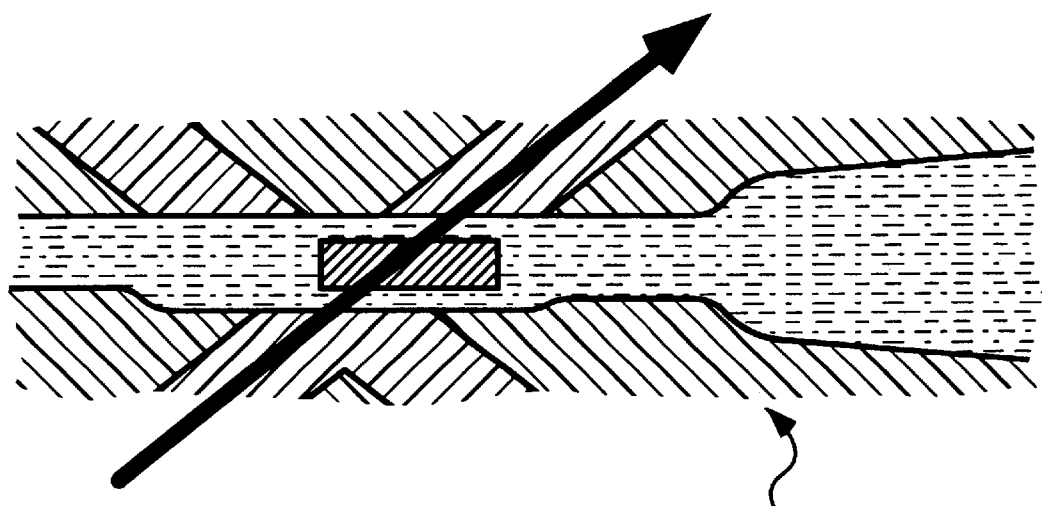
FIGS. 6A to 6F are schematic plan views showing the time evolution of switching action of the embodiment of FIGS. 3 and 4.

FIG. 6A corresponds to FIG. 3A.

Figure 6B:
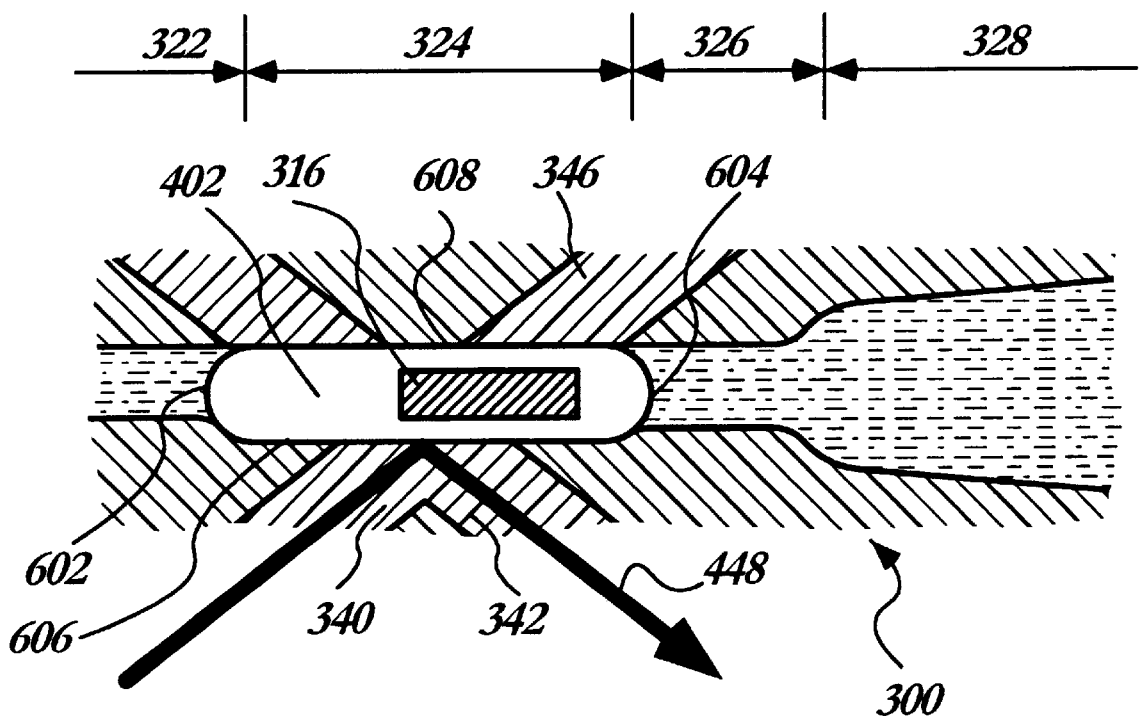

FIG. 6B corresponds to FIG. 4A. Bubble 402 has free surfaces 602 and 604 and has bounded surfaces 606 and 608. The radii of curvature of surfaces 602 and 604 are equal and are given by $$1/r_{f,e,gate} = (1/w_{gate} + 1/h) \qquad \text{Eq. 14}$$

At the time corresponding to FIG. 6B bubble 402 blocks the flow of fluid 1 in the capillary in both downstream and upstream directions, and so accomplishes a first fluid valving function, which is an advantageous capability of the present invention.

Figure 6C:
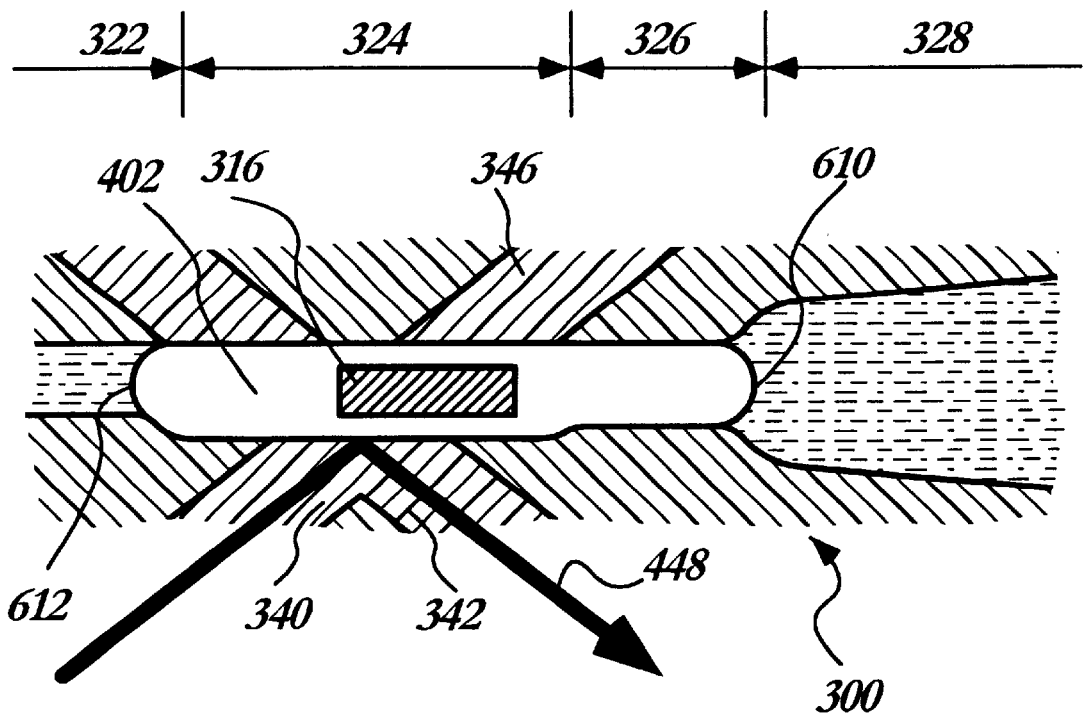

In FIG. 6C, the power applied to resistor 316 has been increased in comparison to that applied in FIGS. 4A and 6B, so that the bubble volume has increased. Because the barrier potential $\Pi_{barrier}$ is less than the source potential $\Pi_{source}$, the bubble grows in the direction of the barrier and free surface 610 moves to the right into the barrier region. Free surfaces 610 and 612 have equal radii of curvature given by $$1/r_{f,e,barrier} = (1/w_{barrier} + 1/h) \qquad \text{Eq. 15}$$

In the time period between FIG. 6B and FIG. 6C, the volume of fluid 1 in the barrier region has been pumped from the barrier region into the drain region. This pumping action is an advantageous capability of the present invention.

In the condition depicted in FIG. 6C, the bubble is still trapped within an energy potential well and resists movement due to perturbation, such as acceleration, along the capillary.

It will be appreciated that the energy of the bubble is minimized when it maintains cohesiveness as a single volume rather than separating into two or more bubble volumes, each requiring the energy associated with supporting two or more free surfaces. Thus the bubble tends to remain a single cohesive unit unless it is disrupted by some high-energy event, and during flow in the capillary it does not tend to split into more than one bubble.

Figure 6D:
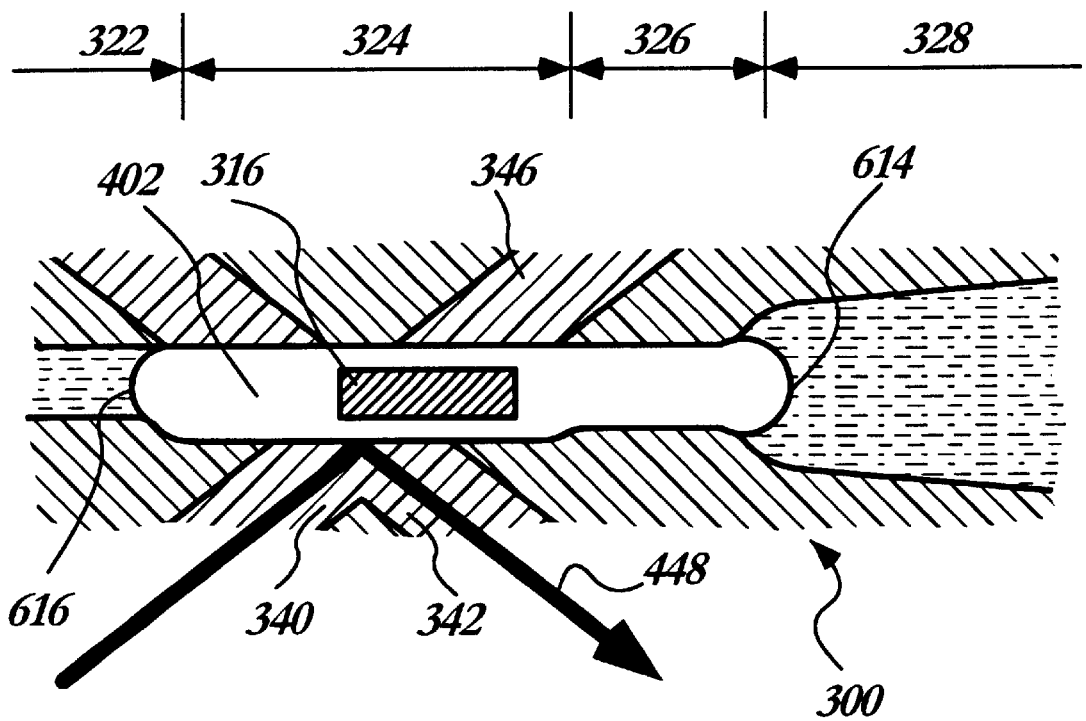

In FIG. 6D, the power applied to the resistor 316 has been increased in comparison to that applied in FIG. 6C. The bubble free surfaces 614 and 616 have increased in radius of curvature from $r_{f,e,barrier}$ to $r_{f,e,gate}$, as the bubble begins to move past the potential barrier, and the bubble has reached a point of metastability. Any further increase in volume will cause it to become unstable and flow into the drain.

Figure 6E:
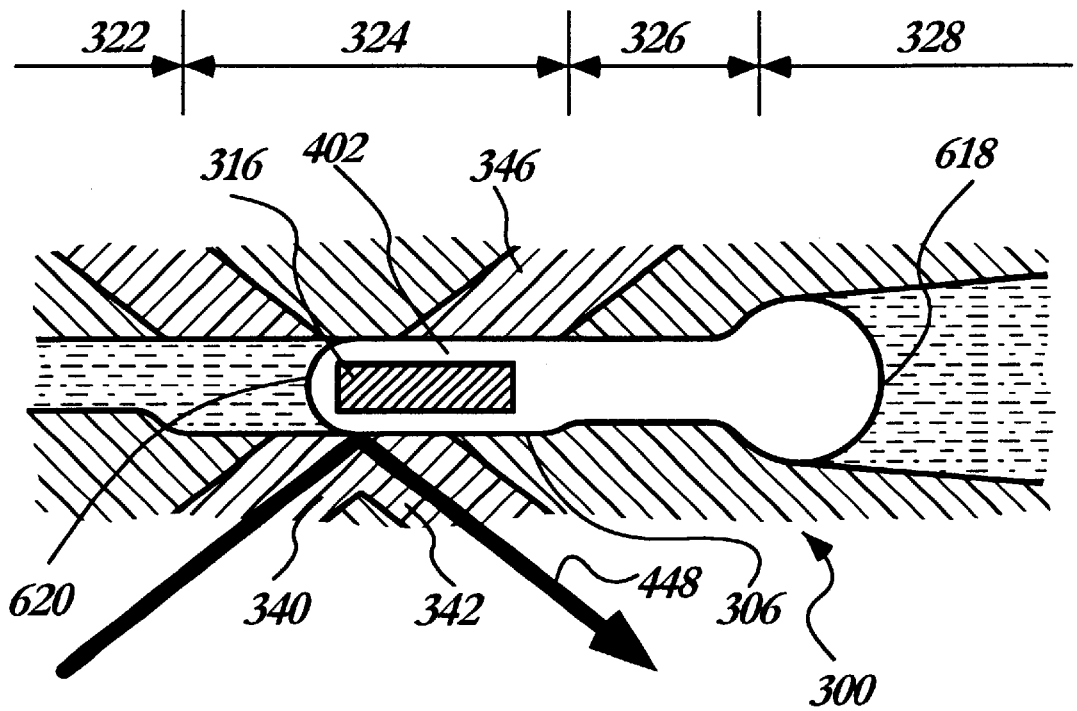

FIG. 6E shows the state of the device after the power applied to resistor 316 has been incrementally increased in comparison to that applied in FIG. 6D. The bubble has become unstable so that it begins to flow into the drain. Free surface 618 is larger in radius than free surface 620, creating a pressure difference that siphons the bubble in the downstream direction. At some time between the states shown in FIGS. 6D and 6E, the power applied to the heating resistor can be ended and the bubble will still be siphoned into the drain. Optical signal 448 is shown as still reflecting, but in fact optical core region 340 is no longer completely covered along wall 306 by bubble 402 and so some optical scattering can occur during this switching transient period.

As the bubble moves from its position in FIG. 6D towards that in FIG. 6E, it unblocks the downstream flow of fluid 1 and so accomplishes a second aspect of the fluid valving capability of the present invention. Upstream flow of fluid 1 is still blocked, however, until a time subsequent to that of FIG. 6F as discussed below.

Figure 6F:
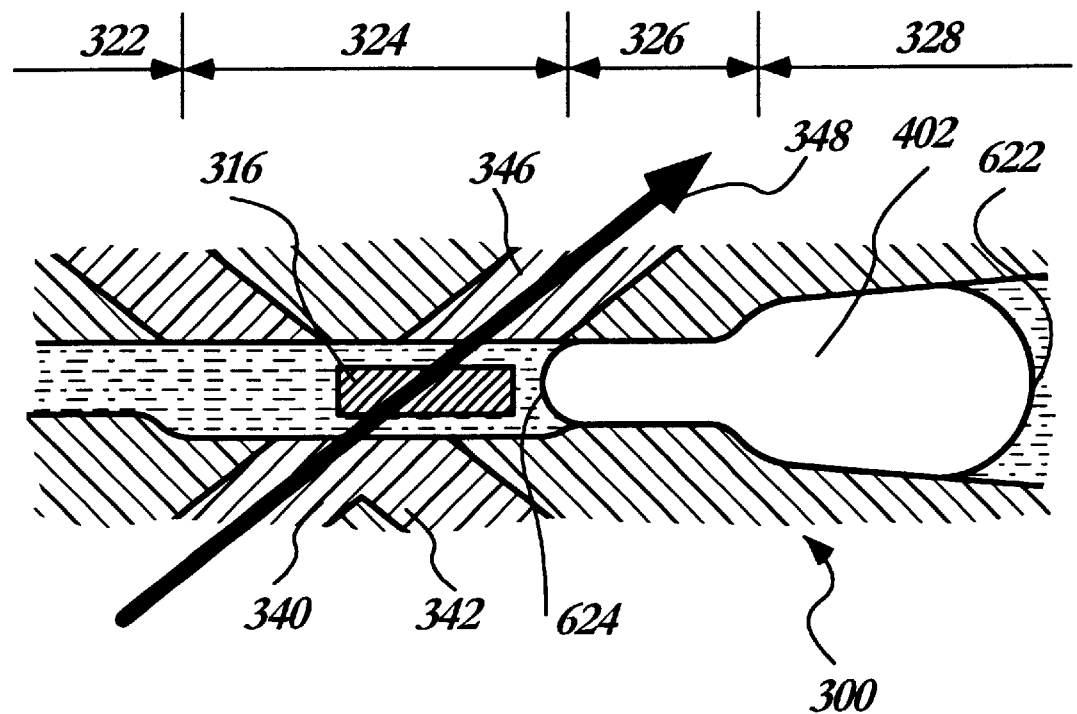

FIG. 6F shows the state of the device when the moving bubble has exited the optical switching area of the gate. Optical signal 348 once again transits from waveguide core region 340 to waveguide core region 346, and the second desired optical switching event of this embodiment of the invention has been accomplished. Free surface 622 is larger in radius than free surface 624, so the bubble continues to be forced into the drain region.

In addition, and advantageously, free surface 622 is larger in radius than free surface 620 in FIG. 6E, so that the bubble accelerates from the time corresponding to FIG. 6E to the time corresponding to 6F. This acceleration shortens the switching time and increases the speed of operation of the device. This advantage is provided by having the drain widen with distance from the barrier.

At the time depicted in FIG. 6F, the bubble is still wall-confined. As it continues to move away from the barrier at a time subsequent to the time of FIG. 6F, it must eventually lose contact with one or more walls of the capillary in the drain region in order to completely unblock the upstream flow of fluid 1, as well as the downstream flow of fluid 1 which became unblocked at a time subsequent to that of FIG. 6D.

Such complete unblocking is a further advantageous feature of the fluid valving capability of the present invention, and may achieved in at least five ways. First, the bubble may lose contact with the drain walls merely because the drain width increases with distance from the barrier. Second, if the bubble is composed substantially of vapor created from boiling of a liquid fluid 1, it will tend to shrink as it leaves the heat source which created the vapor and so will tend to detach from one or more walls of the drain. Third, if the bubble is composed substantially of gas which was liberated from solution in a liquid fluid I to create the bubble, it may also tend to shrink as it encounters cooler regions in which fluid 1 can dissolve more gas. If the bubble is a mixture of gas and vapor, it tends to shrink rapidly as it cools and vapor is transformed to liquid; it may then tend to shrink more slowly as its gas content dissolves into liquid. Fourth, the bubble may enter the outlet reservoir for fluid 1 to which the drain is connected and detach from the drain walls as it enters the reservoir. Fifth, the bubble may be extracted from the drain by some means which separates it from the volume of fluid 1, for example by encountering a filter, a membrane, a pore, and the like which allows the passage of fluid 2 but not of fluid 1.

The power noise margin of the ABC switching operation is defined as the difference between the power needed to maintain bubble 402 in its state as shown in FIG. 6B and the power needed to reach the point of metastability as in FIG. 6D. For robust device operation it is desirable to have the power noise margin be greater than expected fluctuations due to environmental influences. It will be appreciated that as the volume of the barrier increases the power noise margin increases. For embodiment 300 the volume of barrier 325 can be calculated as $V_{barrier}=(h \times w_{barrier} \times L_{barrier})$, and the volume of the gate can be calculated as $V_{gate}=(h \times w_{gate} \times L_{gate})$. The ratio given by $(V_{gate}+V_{barrier})/V_{gate}$ provides an indication of the relative noise margin for various design choices.

The resistance of bubble 402 to acceleration along the capillary is determined by the ratio of equilibrium free-surface radii at a junction between two regions which acts to prevent bubble movement. The sustainable force per unit area on the bubble in the direction of flow at a junction between two regions, such as either source and gate or gate and barrier, is simply the difference in equilibrium free surface pressures between those two regions, or equivalently the energy potential difference. The local effective mass per unit area of the bubble for acceleration purposes is just the length of the bubble multiplied by the density difference between fluid 1 and fluid 2. Thus the maximum sustainable acceleration without displacing the bubble from the potential well is given by multiplying the energy potential difference, the density difference, and the bubble length.

The above descriptions consider only the low-frequency, quasistatic operation of embodiment 300 of the invention in which fluid momentum effects play little role. It will be appreciated by those skilled in the art that at higher frequencies fluid momentum effects will be present, and ultimately both fluid momentum effects and thermal effects limit the upper operating frequency of the invention.

Embodiment 300 is considered a preferred mode of embodiment of the present invention as of the time of this writing. It has been found that switching time for an instance of embodiment 300 is less than 3 milliseconds for the transition between the state of FIG. 6D and that of FIG. 6F where fluid 1 is cyclohexane. Typical dimensions for an instance of embodiment 300 are h=50 µm, $w_{source}$=15 µm, $L_{source}$=250 µm, $w_{gate}$=18 µm, $L_{gate}$=90 µm $w_{barrier}$=18 µm, $L_{barrier}$=30 µm, $w_{drain}$>30 µm, and $L_{drain}$=170 µm.

In embodiment 300 as shown is FIGS. 3, 4, and 6, walls 306 and 308 are substantially perpendicular to the plane of propagation of optical signals 348 and 448, which is advantageous for optical transmission and reflection purposes. In other embodiments capillaries with a variety of cross-sectional shapes including round, oval, or polygonal can be made and used without departing from the scope of the present invention. For example, a tapered trench etched in one substrate can be capped by a flat second substrate to form a capillary of substantially trapezoidal cross section which can be employed in alternative embodiments of the present invention. It is not a requirement that the capillary have continuous walls. Segmented walls, walls with continuous grooves along their length, or arrays of closely spaced pillars can also serve to wall-confine a bubble while providing the desired energy potential relationships of Eq. 13.

Figure 7:
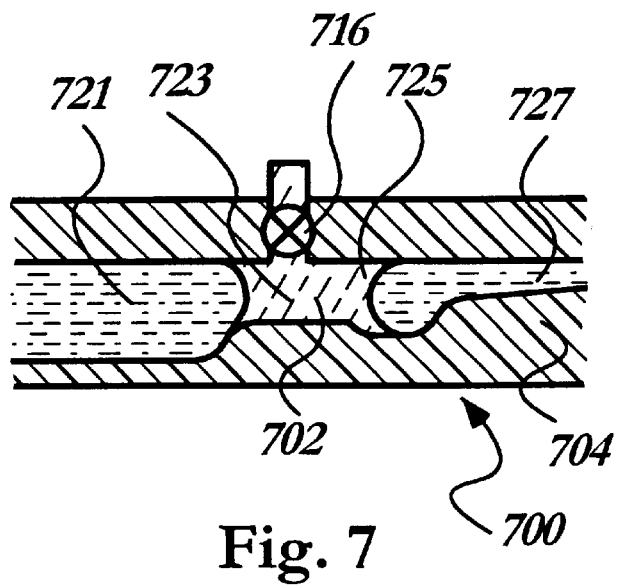
FIG. 7 shows a sectional view of an embodiment of the invention involving capillary walls which are fluiphobic to fluid 1.

Alternative embodiments of the present invention can function in fluiphobic capillaries. FIG. 7 illustrates in sectional view such a fluiphobic embodiment 700. A bubble 702 of fluid 2 is confined by capillary walls of a material 704 which is poorly wetted by fluid 1. For example, fluid 1 may be liquid mercury and fluid 2 may be air while material 704 may be glass. Bubble 702 is introduced through valve 716. Valve 716 may be a mechanical valve, may itself be a separate ABC device, or may be a separate fluidic device. In any case the internal operation of embodiment 700 in switching, valving, or pumping is purely fluidic, and the means by which the bubble is introduced is incidental.

The capillary includes source 721, gate 723, barrier 725, and drain 727. The necessary relationship among the effective free surface radii of the various regions for a fluiphobic embodiment is given by $$r_{f,e,source} > r_{f,e,barrier} > r_{f,e,gate} > r_{f,e,drain} \qquad \text{Eq. 16}$$

In such a fluiphobic embodiment, the direction of curvature of the bubble of fluid 2 is reversed from that in the fluiphilic embodiment of FIG. 3, and so the pressure within a wall-confined bubble of fluid 2 is less than that in fluid 1.

Fluid 2 may be either a gas or a liquid and its introduction through valve 716 is thus either pneumatic or hydraulic in nature.

It might be naively expected that the bubble would collapse if it were a gas and its internal pressure were less than that of fluid 1, but such is not the case because the greater pressure within fluid 1 is supported by the confining interfacial surface tension of the bubble rather than supported by the gas volume within the bubble.

For embodiment 700, the signs of the differential pressures are reversed in comparison to those of embodiment 300, and each differential pressure as per Eq. 4 is less than zero. The magnitude of each differential pressure satisfies the relationship $$|\Delta P_{f,e,source}| < |\Delta P_{f,e,barrier}| < |\Delta P_{f,e,gate}| < |\Delta P_{f,e,drain}| \qquad \text{Eq. 17}$$

In Eq. 17 the vertical brackets, | |, signify the absolute value (magnitude) of the differential pressure. The energy potential relationships given by Eq. 13 are nevertheless achieved for embodiment 700 because the sign of the subtraction between any two differential pressures must be reversed, in comparison to that for embodiment 300, in order to compute the energy potential differences between two regions. Thus, for example, for embodiment 700, if the gate is chosen as the reference point at which energy potential is defined to be zero, then $\Pi_{source} = \Delta P_{f,e,gate} - \Delta P_{f,e,source}$.

Operation of embodiment 700 is analogous to operation of embodiment 300. The bubble is introduced to gate region 723, grows with the input of energy to fill barrier region 725, becomes unstable, and exits into drain region 727. The state of bubble 702 as shown is one of metastability, and any further growth toward the drain region will cause it to become unstable and flow into the drain. Thus the state of embodiment 700 in FIG. 7 corresponds in time to that of embodiment 300 in FIG. 6D.

It will be appreciated that, because the width of drain region 727 decreases with distance from barrier region 725, bubble 702 cannot detach from the capillary walls as it moves merely because the capillary becomes wider as was the case with embodiment 300. Thus there is at least one less mechanism available in embodiment 700 for restoring the free flow of fluid 1 than there was in embodiment 300 above.

Alternative embodiments of the present invention can also employ differences in surface wetting properties rather than differences in geometry. FIG. 8 illustrates an embodiment 800 of the present invention in which geometry is uniform through source, gate, barrier, and drain but in which the relationship of Eq. 13 is achieved through the use of different materials.

Figure 8A:
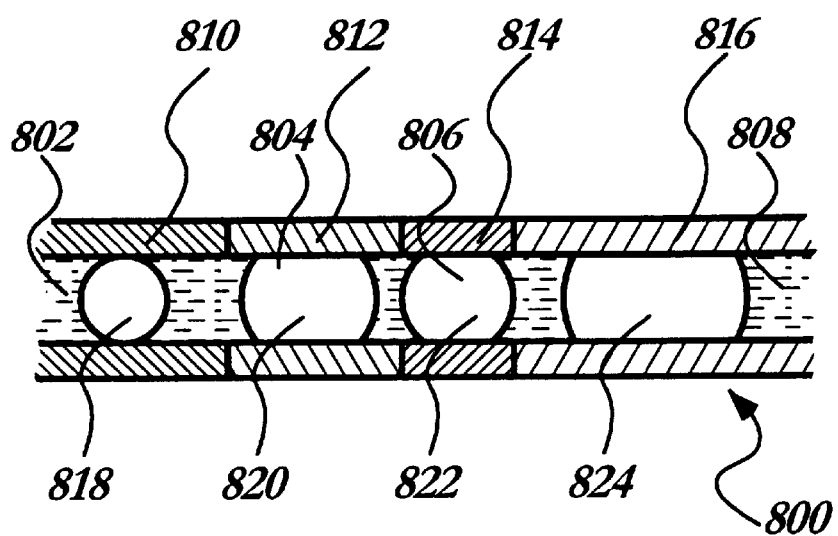
FIG. 8A shows a schematic plan view of an embodiment of the present invention in which the properties of the capillary materials rather than geometry are employed to create the desired asymmetries in energy potential.

FIG. 8A illustrates four wall-confined bubbles in the four regions of device 800 to demonstrate the different equilibrium free surface radii of the four regions. Source 802, gate 804, barrier 806 and drain 808 have walls having materials 810, 812, 814, and 816 respectively, and contain wall-confined bubble 818, 820, 822, and 824 respectively. In embodiment 800 the walls are generally fluiphilic, although their wetting characteristics vary to achieve by design the relationships among equilibrium free surface radii given by Eq. 11.

Figure 8B:
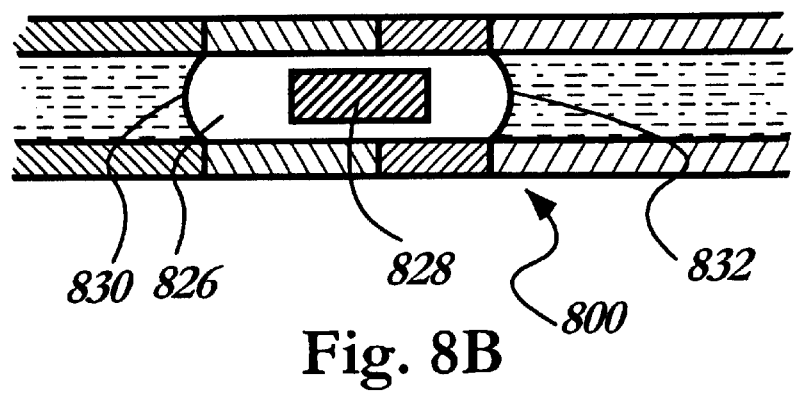
FIG. 8B shows a schematic plan view of an embodiment of the present invention in which the properties of the capillary materials are employed to create the desired asymmetries in energy potential and having a heater.

FIG. 8B illustrates the operation of embodiment 800 as an ABC. A single bubble 826 of fluid 2 is created by bubble generator 828 which may be, for example, a patch of light-absorbing material heated by a laser beam to create a bubble by boiling fluid 1. Free surfaces 830 and 832 have equal radii of curvature determined by the equilibrium free surface radius, $r_{f,e,barrier}$, of the barrier region. The bubble fills both the gate and the barrier and is at the point of metastability wherein an incremental increase in bubble volume will cause it to intrude into barrier region 808 and exit gate region 804. The illustrated state of embodiment 800 shown in FIG. 8B thus corresponds to the state of embodiment 300 as shown in FIG. 6D and to that of embodiment 700 as shown in FIG. 7.

Figure 9A:
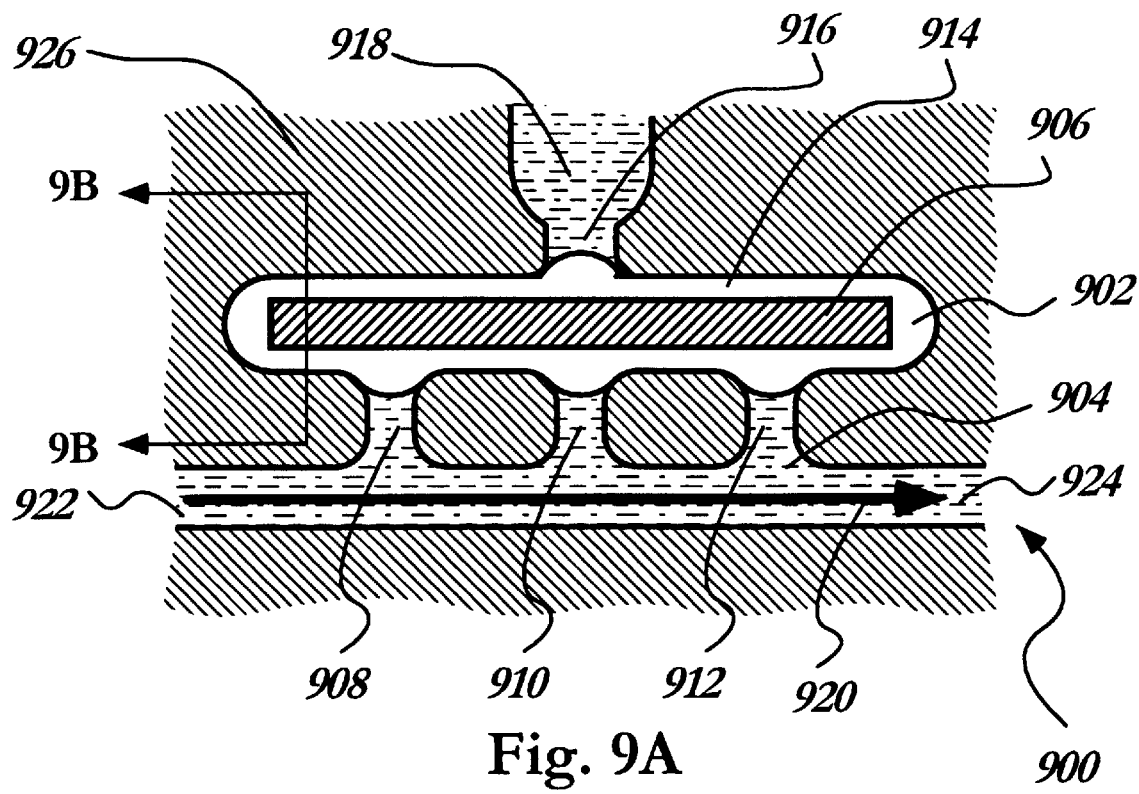
FIGS. 9A and 9B show an embodiment of the invention with multiple source channels for use as a thermal degasser for liquids.
Figure 9B:
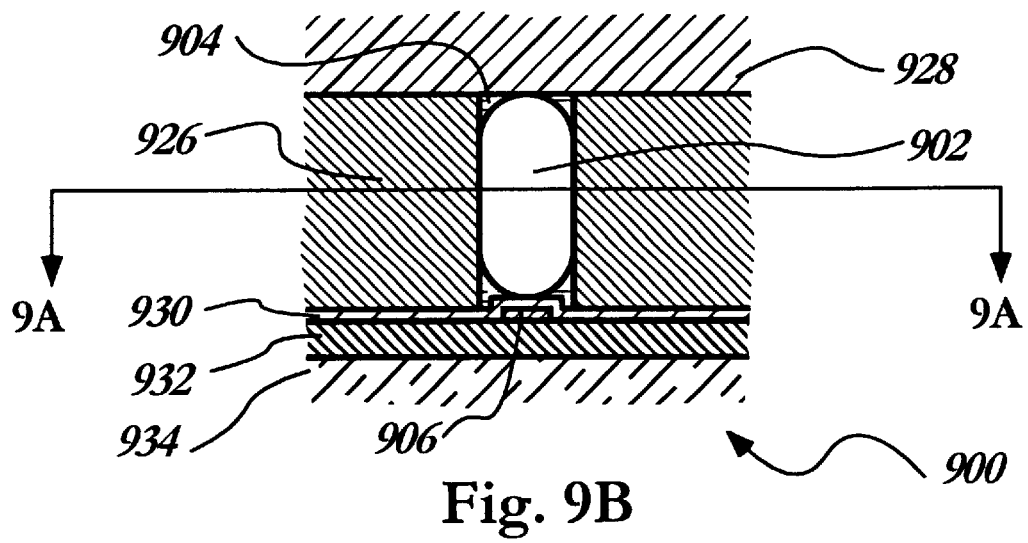

FIG. 9 illustrates a fluiphilic embodiment 900 of the present invention for use in removing dissolved gas from a liquid. FIG. 9A is a top sectional view and FIG. 9B is a side sectional view. Bubble 902 contains dissolved gas liberated from liquid 904 by heater 906 plus the vapor of liquid 904 generated by heater 906. Multiple source necks 908, 910, and 912 admit liquid 904 to gate 914. Barrier 916 traps bubble 902 until sufficient energy is added to make the bubble flow into drain 918 and so to remove it from proximity to liquid flow 920. Flow 920 of liquid 904 may be rich in dissolved gas where it enters the device at point 922 and is less rich in dissolved gas where it exits at point 924. It should be appreciated that, while only three source necks 908, 910, and 912 are shown for purposes of illustration, in practice many source necks acting in parallel are desirable for efficient removal of dissolved gas from liquid 904, and that in addition multiple instances of a device such as embodiment 900 may be placed in series in flow 920 to efficiently reduce dissolved gas concentration.

The structural details of embodiment 900 are as follows. Material 926 which may be a photodefinable polymer such as photoresist or photosensitive epoxy into which a groove can be defined by lithographic means to form the sidewalls of the capillary. Material 928 may be a glass layer bonded on top of material 926 to form the roof of the capillary. Layer 930 is an electrically insulating material such as silicon dioxide covering heater 906. Layer 932 is an electrically and thermally insulating layer such as silicon dioxide, and substrate 934 is a thermally conductive material such as silicon.

The present invention does not rely on primarily on thermocapillarity, i.e., the Marangoni effect, but instead relies primarily on capillary geometry and materials properties to control bubble movement. The invention can function in embodiments such as 300 and 700 above whether the Marangoni phenomenon helps or hinders its operation because geometric effects on radius of curvature can be designed to be much larger than temperature effects on surface tension. However, the Marangoni effect can be employed as a second-order controlling effect in a multiple-drain version of the present invention to choose a direction in which the bubble will exit from the gate.

Figure 10:
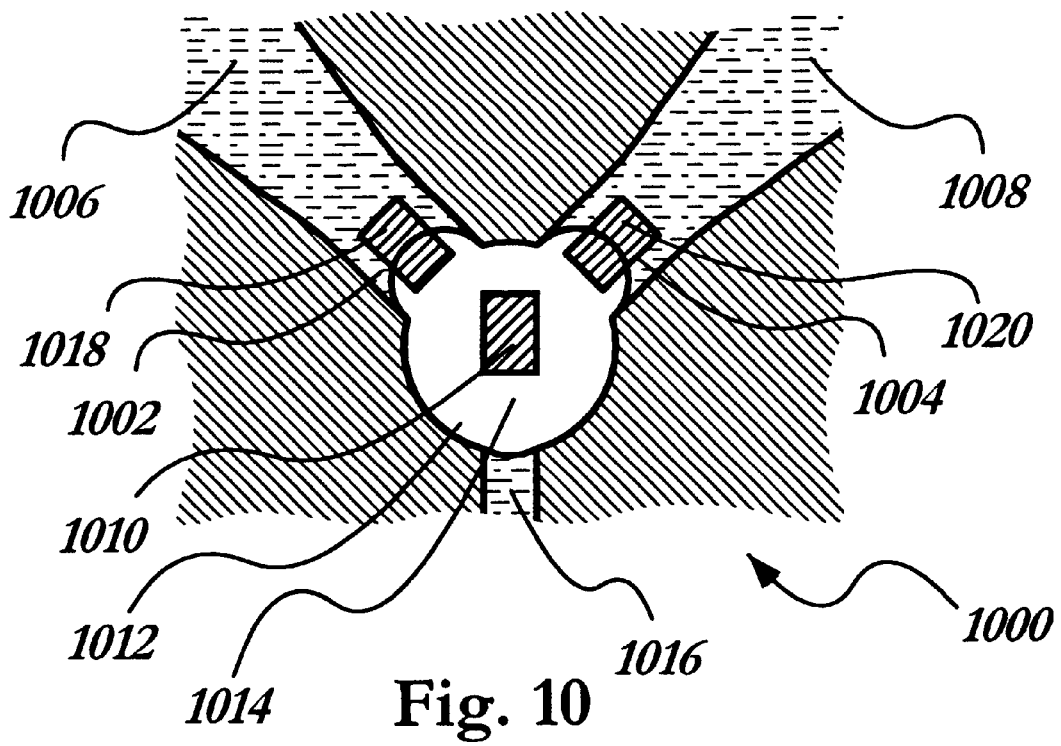
FIG. 10 shows a plan view of an embodiment of the present invention which exploits the Marangoni effect to control which of two barriers acts as the exit path for a bubble.

FIG. 10 shows a schematic top sectional view of a fluiphilic embodiment 1000 of the present invention with multiple barriers 1002 and 1004 and with multiple drains 1006 and 1008. The materials set for embodiment 1000 may be the same as that for embodiment 900, although this is not necessary.

Heater 1010 generates a bubble 1012 in gate 1014 which is trapped by relatively higher energy potentials in barrier 1002, barrier 1004, and source 1016. Barriers 1002 and 1004, even though designed to have the same equilibrium free surface radii, will almost always have some difference in those radii due to manufacturing variations. Thus bubble 1014 will almost always exit gate 1016 through one or the other of barriers 1002 and 1004, and hardly ever through both at the same time.

However, the Marangoni effect can be used to decrease the equilibrium free surface pressure in one barrier relative to the other by locally reducing the surface tension of the bubble, as can be appreciated by considering Eq. 4 above. The equilibrium contact angle, $\theta_e$, taken within fluid 1 is nearly constant with temperature, and in association with the capillary geometry sets the equilibrium free surface radius $r_{f,e}$ within a barrier region to be nearly constant with temperature. However, surface tension, $\sigma$, decreases as temperature increases and so the equilibrium free surface pressure, $\Delta P_{f,e}$, also decreases as temperature increases. If one barrier region, for example 1002, is heated by heater 1018 while heater 1020 is cold, the equilibrium free surface pressure, $\Delta P_{f,e}$, decreases in barrier 1002 and so the energy potential of that barrier decreases relative to barrier 1004. It thus becomes easier to the bubble 1014 to exit gate 1014 through barrier 1002 than through barrier 1004.

Figure 12:
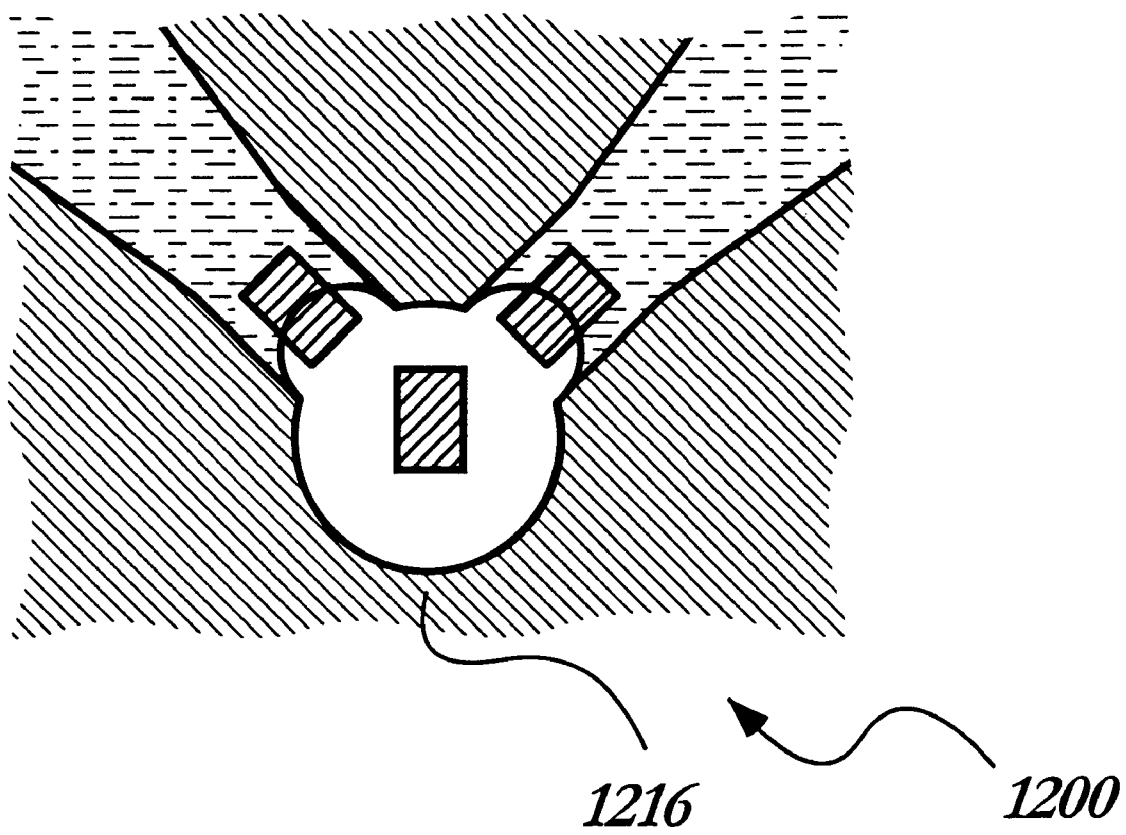
FIG. 12 shows a plan view of an embodiment of the present invention which has no source region.

Source 1016 may serve as the path for liquid refill as in embodiments described above. However, it can be seen that, if there is no restriction to reverse flow from drain 1008 through barrier 1004, refill may also or instead occur from drain 1008 through barrier 1004 into gate 1014. Thus in embodiment 1000 a barrier may function also as a source, demonstrating that the functional roles of source and barrier can be reversed by means of local heating. In such an embodiment the source 1016 can be plugged or absent and the device can still function because one or the other barrier acts as a source. FIG. 12 shows an embodiment similar to that of FIG. 10 but in which the source 1016 is absent. In the embodiment of FIG. 12, one of the barriers (similar to barriers 1002 and 1004 of FIG. 10) can function as the source. At position 1216 (which correspond to the position of the source 1016 of FIG. 10), solid material forms the wall of the gate.

Advantageously, embodiment 1000 controls the direction of fluid movement without using a solid moving part such as a swinging gate or other mechanical valve which may be slow, prone to failure, and difficult to make in a small size.

Figure 11:
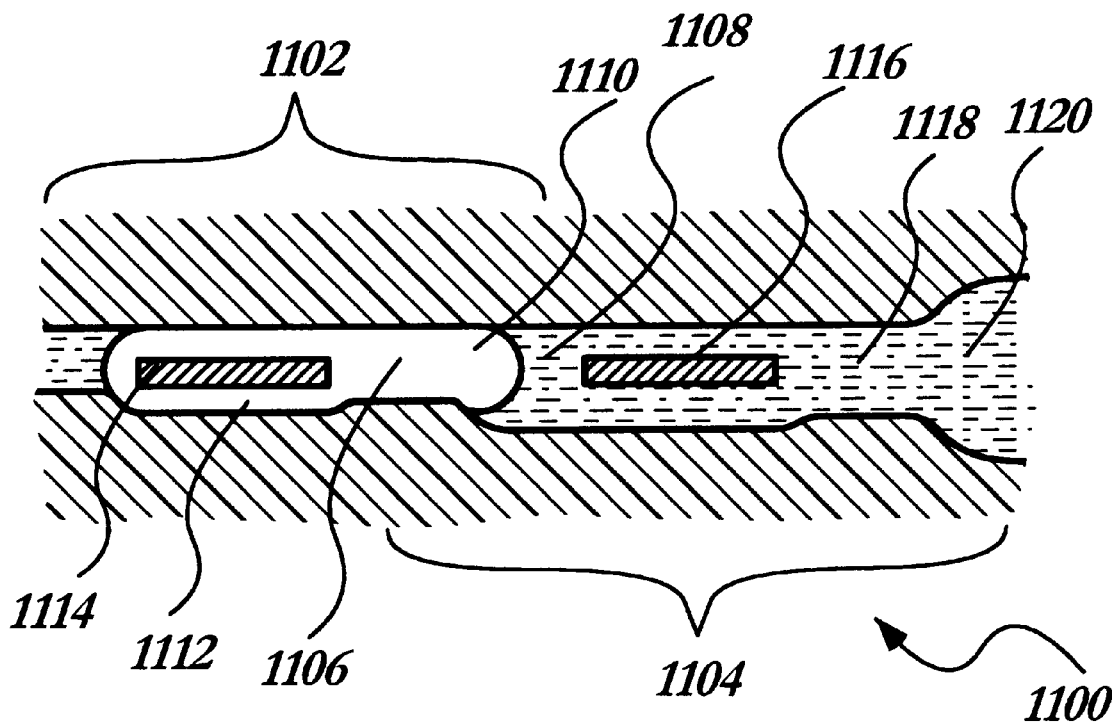
FIG. 11 shows a sectional view of an embodiment of the present invention in which two ABC devices are placed in tandem to maximize the switching transition speeds of the downstream ABC.

FIG. 11 shows an embodiment 1100 of the present invention in which two ABC devices 1102 and 1104 are placed in tandem so that region 1106 includes both the barrier of upstream ABC 1102 and the source of downstream ABC 1104, while region 1108 includes both the drain of upstream ABC 1102 and the gate of downstream ABC 1104. This arrangement can be advantageous to the operation of the downstream ABC 1104 because both bubble introduction to the gate 1108 of the downstream ABC and extraction from that gate occur by the same type of mechanism.

Bubble 1110 is pre-generated in the gate 1112 of the upstream ABC using bubble generator 1114 which may, for example, be a set of electrodes which electrolyze water constituting fluid 1 into a mixture of oxygen and hydrogen gases constituting fluid 2.

Bubble 1110 can then be grown in volume by energy input to fill or nearly fill barrier 1106 of the upstream ABC so that it is just below the point of metastability in energy. It can then be rapidly injected by a small additional energy input into the gate 1108 of downstream ABC 1104. Thus, introduction of the bubble 1110 into downstream ABC 1104 is accomplished by microfluidic means. Advantageously, the volume of bubble 1110 when it is at the point of metastability can be designed to equal the volume of the gate 1108 of downstream ABC 1104, so that it completely fills region 1108 when first injected into that region.

In downstream ABC 1104 the bubble is maintained by element 1116 which may, for example, be a heating resistor. Increasing the power to element 1116 increases the size of the bubble, as in embodiment 300 above, and eventually leads to a second switching operation as the bubble exits through barrier 1118 and into drain 1120 of the downstream ABC 1104.

Embodiments 300 (FIG. 3), 700 (FIG. 7), 800 (FIG. 8), and 900 (FIG. 9) above illustrate instances of devices such as heating resistors, valves, or laser-heated patches which provide all aspects of bubble introduction, bubble maintenance, and bubble growth in a unitary fashion. Embodiments 1000 (FIG. 10) and 1100 (FIG. 11), in contrast, illustrate a separation of bubble movement functions. In embodiment 1000 heater 1010 generates the bubble and maintains the bubble in the gate, while heater 1018 provides control of the direction of bubble growth and can also provide heat to aid in growing the volume of the bubble. In embodiment 1100 the bubble is generated by generator 1114, is introduced into the downstream gate 1108 by upstream ABC 1102, is maintained by element 1116, and is then increased in volume by the same element 1116. Thus the above embodiments illustrate instances of unitary and separated bubble controlling functions, and illustrate instances of thermal, pneumatic, hydraulic, optical, electrolytic, and microfluidic mechanisms which may be used for bubble generation, introduction, maintenance, growth, and movement. Other mechanisms for bubble generation, introduction, maintenance, growth, and movement will occur to those skilled in the art without departing from the scope of the present invention, for example the generation of gas bubbles by ultrasonic agitation.

The above examples are related to embodiments that are either fluiphilic to fluid 1 or fluiphobic to fluid 1. However, embodiments that mix fluiphilic portions with fluiphobic portions can be implemented by one skilled in the art based on the present disclosure.

Various geometries, various materials, and various combinations of fluids can be used to embody the present invention. Table 1 below describes examples of a few possible ABC embodiments. These embodiments are not to be taken as limiting but rather are illustrative.

In Table 1, the "fluiphilic" geometry is similar to that of embodiment 300 above in which the equilibrium contact angle taken within fluid 1 is less than ninety degrees and in which the pressure relationships of Eq. 12 are satisfied. The "fluiphobic" geometry is similar to that of embodiment 700 in which the equilibrium contact angle taken within fluid 1 is greater than ninety degrees and in which the pressure relationships of Eq. 17 are satisfied. The "wetting" geometry is similar to that of embodiment 800 in which variations in wall material wetting properties rather than geometry variations achieve the energy potential relationships of Eq. 13. It should be appreciated that in all embodiments of the present invention, wetting properties are important to the functionality of the ABC.

Figure 13A:
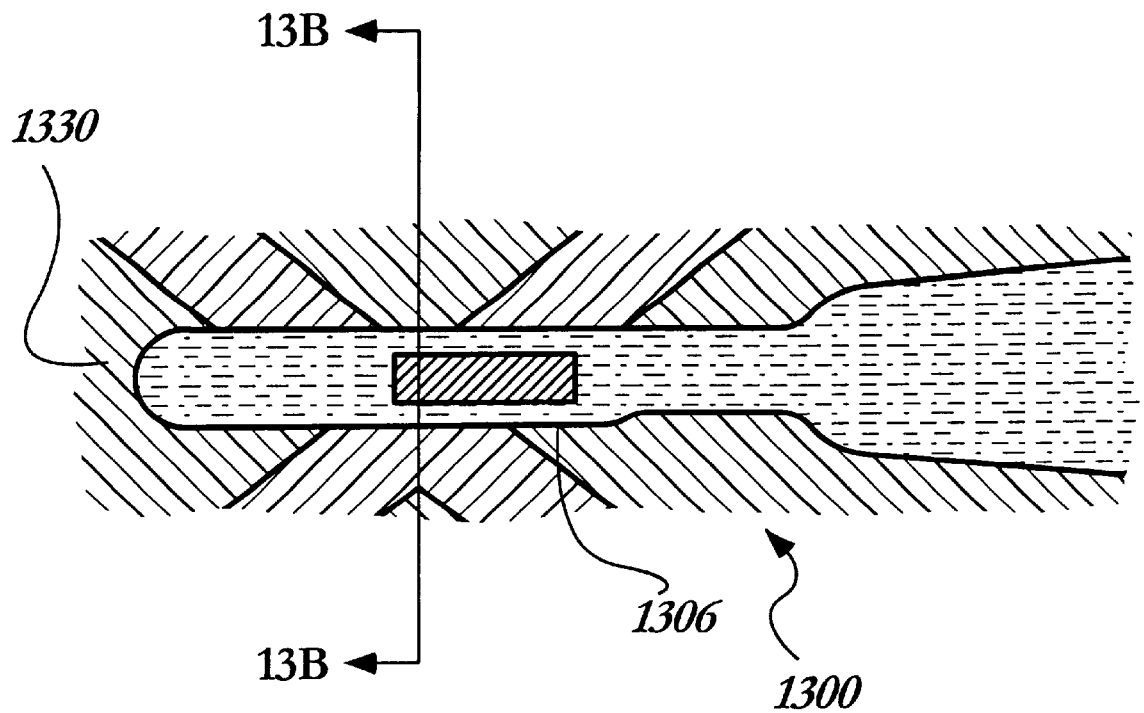
FIG. 13A shows a sectional plan view of an embodiment of the present invention having regions laid out on different planes.
Figure 13B:
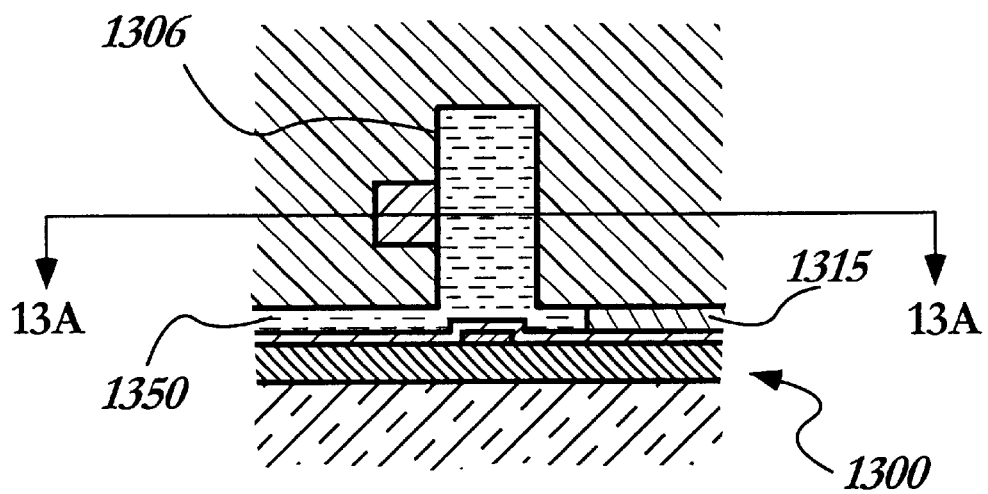
FIG. 13B shows a sectional view of the embodiment of FIG. 13A taken at a plane right angle to the plane of FIG. 13A.
Figure 14A:
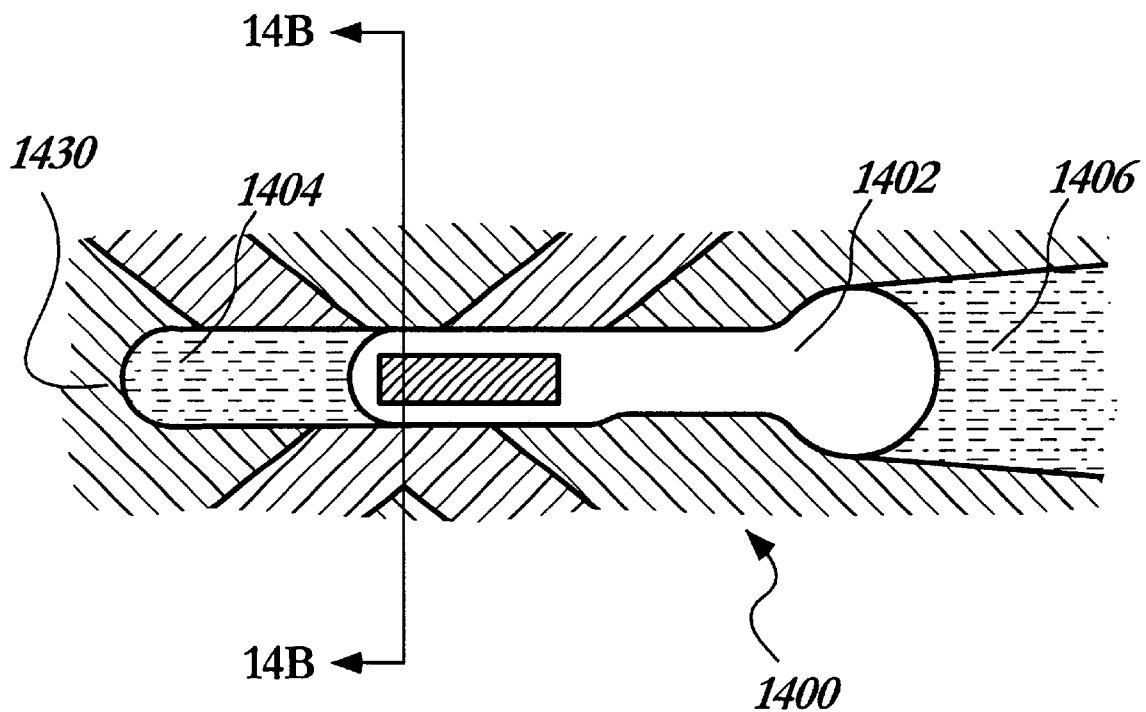
FIG. 14A shows a sectional plan view of an embodiment of the invention in which there is no separate source region.
Figure 14B:
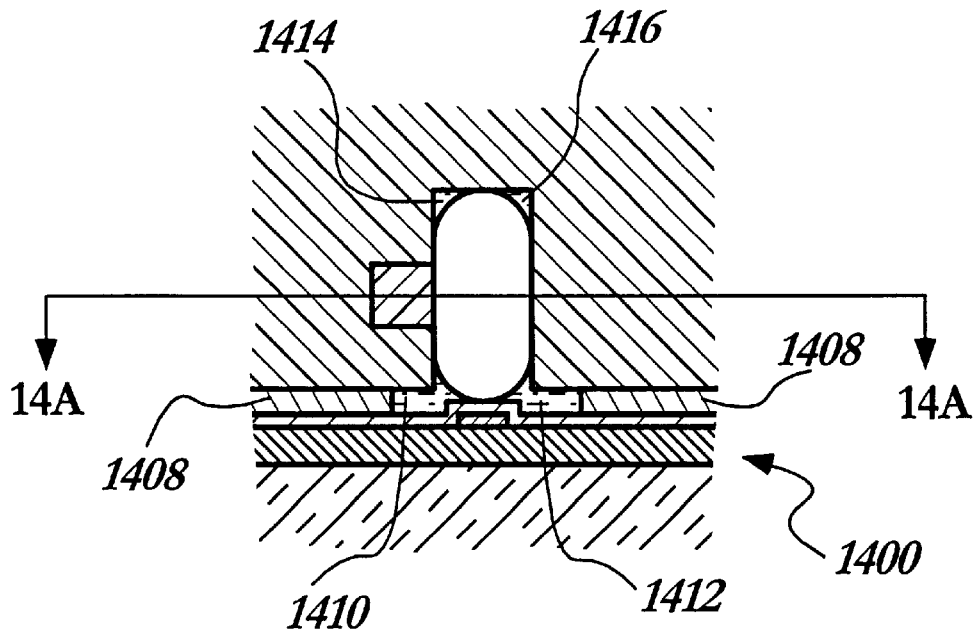
FIG. 14B shows a sectional view along line 14B—14B of FIG. 14A of an embodiment of the invention in which there is no separate source region.

All of the embodiments illustrated above have placed the source, gate, barrier, and drain regions in a single plane for purposes of illustration, and because fabrication of elements in a single plane is easy using lithrographic techniques familiar to the microelectronics world. However, co-planarity of the regions is not a requirement of s the invention. For example, it would be a simple matter to modify embodiment 300 as shown in FIG. 3 so that the source was defined in material 315 rather than material 304. FIGS. 13A and 13B illustrate such an embodiment. In FIG. 13A a source is not seen connected to the gate 1306 because the gate is at a different plane in the switching device 1300. Position 1330 (which corresponds to the position of a source in embodiments such as position 406 of FIG. 4) is just solid material. In embodiment 1300, the source 1350 is connected to the gate 1306 at right angle to the orientation of the gate 1306 and the downstream channel. The space 1315 on the other side of the gate 1350 opposite to the source 1350 is plugged with solid material. FIG. 14 shows an embodiment 1400 similar to embodiment 1300 but in which no separate source region is present at location 1430. In contrast to embodiment 1300 in which the separate source region 1350 is present, in embodiment 1400 layer 1408 exists on either side of the capillary. In this extreme case, refill of fluid 1 is provided by leakage flow past the moving bubble. As bubble 1402 flows from gate 1404 to drain 1406, fluid 1 is able to slowly refill gate 1404 by flowing in blow-by paths 1410, 1412, 1414, and 1416 in an upstream direction from the drain to the gate.

Applications of the present invention other than those considered herein will occur to those skilled in the art without departing from the scope of the invention. It is anticipated that such applications will arise in the fields of genomics, proteomics, chemical analysis, biomedicine, optics, and microfluidics, among others. Such applications can also use other energy potential sources, for example inertial means such as acceleration or centrifugation, to aid, oppose, or modify the energy potentials present in the ABC. Centrifugation, for example, can increase the energy of a trapped bubble without increasing its volume. An example of hydrophobic wall material that can be used in a fluiphobic system is polytetrafluoroethylene (PTFE), e.g., TEFLON made by DuPont Company.

TABLE 1

Various fluid and materials combinations for example ABC embodiments.

| Wall materials | Filling fluid (fluid 1) | Bubble fluid (fluid 2) | Geometry |
|---|---|---|---|
| Glass | Water | Water vapor | Fluiphilic |
| Glass | Water | Mercury | Fluiphilic |
| Glass | Air | Mercury | Fluiphilic |
| Glass | Mercury | Air | Fluiphobic |
| Glass | Oil (easily wets walls) | Air | Fluiphilic |
| Glass | Oil (wets walls more easily than does Water) | Water | Fluiphilic |
| PTFE | Water | Air | Fluiphobic |
| Glass, polyethylene, polypropylene, and PTFE | Water | Air | Wetting |

Although the above embodiments of the present invention have been described and illustrated in detail, it is to be understood that a person skilled in the art can make modifications within the scope of the invention. Furthermore, although the scientific theory of bubble movement has been described in the above, the application of the present invention is not dependent on any particular theory and can be practiced by one skilled in the art.

What is claimed is:

1. A fluid-control method comprising the steps of:
   introducing a wall-confined bubble into a gate region of a capillary fluid channel;
   maintaining said bubble in said gate region using a barrier region of higher energy potential with respect to said bubble than said gate region and a source region of higher energy potential than said barrier region; and
   increasing the energy of said bubble so that it exits said gate region into a drain region via said barrier region.

2. A fluid-control method as recited in claim 1 wherein, in said increasing step, said bubble extends from said gate region to said drain region before exiting said gate region.

3. A fluid-control device comprising:
   a capillary fluid channel for confining a first fluid, having source, gate, barrier, and drain regions such that said gate region is bounded by said source and barrier regions, and said barrier region is bounded by said gate and said drain regions, said regions being ordered as drain, gate, barrier, and source in terms of increasing potential relating to a wall-confined bubble of a second fluid; and
   energizer means for increasing the energy of said wall-confined bubble while it is in said gate region.

4. A device as recited in claim 3 wherein said energizer means also introduces said bubble into said gate region.

5. A device as recited in claim 3 wherein, as long as the energy of said bubble is below a first energy level, said source region and said barrier region maintain said bubble in said gate region.

6. A device as recited in claim 5 wherein, when said energizer means increases the energy of said bubble sufficiently said bubble exits from said gate region to said drain region via said barrier region.

7. A device as recited in claim 5 wherein, when said energizer means increases the energy of above a second energy level greater than said first energy level, said bubble extends from said gate region to said drain region.

8. A device as recited in claim 7 wherein, when said energizer means increases the energy of said bubble above a third energy level greater than said second energy level, said bubble exits from said gate region to said drain region via said barrier region.

9. A device for controlling the movement of a fluid, comprising:
   (a) a capillary having regions of differing energy potential within the capillary, the energy potential pertaining to the introduction of a wall-confined bubble of a second fluid into the capillary when said capillary is filled with a first fluid immiscible with the second fluid, the regions including a source region, a gate region, a barrier region, and a drain region, which are connected in that spatial sequential order, and wherein the energy potentials are ordered such that
      (i) the energy potential of the source region is great than the energy potential of the barrier region;
      (ii) the energy potential of the barrier region is greater than the energy potential of the gate region;

(iii) the energy potential of the gate region is greater than the energy potential of the drain region;

(b) a bubble supplier for introducing into the gate region a bubble of the second fluid; and (c) a power supply for increasing the energy of the bubble to overcome the barrier in energy potential between the gate region and the drain region such that the energy potential difference between the gate region and the drain region will cause the bubble to move from the gate region past the barrier region to the drain region.

10. A method for controlling the movement of a bubble in a channel, comprising:

(a) introducing a bubble of a second fluid into a channel having regions of differing energy potential within the capillary, the energy potential pertaining to the introduction of a wall-confined bubble of a second fluid into the capillary filled with a first fluid immiscible with the second fluid, the regions including a gate region, a barrier region, and a drain region, which are connected in that spatial sequential order, and wherein the energy potentials are ordered such that (i) the energy potential of the barrier region is greater than the energy potential of the gate region;

(ii) the energy potential of the gate region is greater than the energy potential of the drain region;

(b) subsequently increasing the energy of the bubble to cause the bubble to move downstream from the gate region to the drain region due to the energy potential difference between the gate region and the drain region; and (c) flowing the first fluid to the gate region from a source region connected to the gate region in the capillary as the bubble moves from the gate region.

11. The method according to claim 10 comprising introducing the bubble in the gate region and increasing the size of the bubble to overcome the barrier in energy potential between the gate region and the drain region.

12. The method according to claim 10 wherein the bubble of the second fluid is moved using no solid mechanical moving part.

13. The method according to claim 10 wherein the bubble of the second fluid is moved solely by differences in fluid pressures arising from energy potential differences within the capillary.

14. The method according to claim 10 wherein the first fluid is a liquid and the second fluid is gaseous.

15. A device for pumping a liquid, comprising:

a capillary having regions of differing energy potential within the capillary, the energy potential pertaining to the introduction of a wall-confined bubble of a fluid (bubble fluid) into the capillary when said capillary is filled with a liquid immiscible with the bubble fluid, the regions including a gate region, a barrier region, and a drain region, which are connected in that spatial sequential order, the regions further including a source region connected to the gate region to provide the liquid to the gate region, wherein the energy potentials are ordered such that (a) the energy potential of the source region is greater than the energy potential of the barrier region;

(b) the energy potential of the barrier region is greater than the energy potential of the gate region;

(c) the energy potential of the gate region is greater than the energy potential of the drain region; and wherein a bubble of the bubble fluid can be introduced into the gate region of the capillary filled with the liquid and confined by the gate region capillary wall circumferentially, the energy of the bubble can be increased to cause the bubble to move downstream due to the energy potential difference between the gate region and the drain region, the bubble pushing the liquid from the gate region past the barrier region to the drain region and beyond; whereupon the gate region is replenished with additional liquid coming from the source region.

16. The device according to claim 15 wherein the liquid is fluiphilic to the capillary walls and the bubble fluid is gaseous, the regions having substantially rectangular cross sections and of substantially uniform height but differing widths, the gate region having a gate width, the barrier region having a barrier width less than the gate width, the drain region having a drain width greater than the gate width, the source region having a source width less than the barrier width, the device further comprising an electrical resistor heater adjacent to the gate region, whereby a wall-confined gas phase bubble which substantially fills the volume of the gate region can be created within the liquid by heating, and whereby the volume of the gas phase bubble can be increased to fill both the gate region and the barrier region and to intrude into the drain region, and whereby the volume of the gas phase bubble can be further increased to cause it to move from the gate region to the drain region.

17. A device for degassing a liquid, comprising:

(a) a gate channel portion in a channel at which the liquid can be heated to obtain from dissolved gas a bubble which is wall-confined in the gate channel portion;

(b) a barrier channel portion in the channel, connected to the gate channel portion downstream thereto;

(c) a drain channel portion in the channel, connected to the barrier channel portion downstream thereto; wherein the gate channel portion, the barrier channel portion, and the drain channel portion are in fluid communication in that spatial sequential order and having differing energy potentials, the energy potentials pertaining to a wall-confined bubble in the liquid; the barrier channel portion having an energy potential greater than the energy potential of the gate channel portion, the gate channel portion having an energy potential greater than that of the drain channel portion;

(d) one or more source channel portions connected to the gate channel portion such that liquid can flow from each source channel to the gate channel portion for degassing, each source channel portion having dimensions to effect an energy potential greater than the energy potential of the gate channel portion; and (e) heater for heating the liquid near the gate channel portion to release gas thereinto;

wherein gas released into the gate channel portion will increase the size of the bubble therein to cause the bubble to move from the gate channel portion to the drain channel portion due to the difference in energy potentials between the gate channel portion and the drain channel portion.

18. The device according to claim 17 wherein the liquid is fluiphilic to the capillary walls, and the gate, the source, barrier, and drain channel portions have substantially rectangular cross sections and of substantially uniform height but differing widths, the gate region having a gate width, the barrier channel portion having a barrier width less than the gate width, the drain channel portion having a drain width greater than the gate width, the source region having a source width less than the barrier width, the device further comprising an electrical resistor heater adjacent to the gate region, whereby a wall-confined gas phase bubble which substantially fills the volume of the gate region can be created within the liquid by heating, and whereby the volume of the gas phase bubble can be increased to fill both the gate region and the barrier region and to intrude into the drain region, and whereby the volume of the gas phase bubble can be further increased to cause it to move from the gate region to the drain region.

19. A liquid-controlling valve, comprising:
(a) a capillary having a source region, gate region, barrier region, and drain region, spatially connected in that sequence, the regions having substantially rectangular cross-sections with substantially uniform height and differing widths, the gate region has a gate width, the barrier region having a barrier width less than the gate width, the drain region having a drain width greater than the gate width, the source region having a source width less than the barrier width; and
(b) electrical resistor heater adjacent to the gate region, whereby when the capillary is filled with a liquid a wall-confined gas phase bubble that substantially fills the volume of the gate region can be created within the liquid by heating, thereby blocking the flow of the liquid between the source region and the drain region, and whereby the volume of the gas phase bubble can be increased to fill both the gate region and the barrier region and to intrude into the drain region, and whereby the volume of the gas phase bubble can be further increased to cause it to move from the gate region to the drain region; thereby unblocking flow of the liquid from the source region to the drain region.

20. The valve according to claim 19 wherein the width of the drain region increases with distance from the barrier region.

21. The valve according to claim 19 wherein the volume of the bubble decreases while it is within the drain region, thereby unblocking flow of the liquid from the drain region to the source region.

22. The valve according to claim 19 wherein the bubble can separate from contact with one or more walls of the capillary within the drain region, thereby unblocking flow of the liquid from the drain region to the source region.

23. A device for controlling movement of a bubble in a capillary, comprising:
a capillary having regions of differing energy potentials pertaining to the introduction of a wall-confined bubble of a second fluid into the capillary when said capillary is filled with a first fluid immiscible with the second fluid, the regions including a gate region, a barrier region, and a drain region connected in that spatial sequential order, the regions further including a source region connected to the gate region to provide the first fluid to the gate region, wherein the energy potentials are ordered such that
(a) the energy potential of the source region is greater than the energy potential of the barrier region;
(b) the energy potential of the barrier region is greater than the energy potential of the gate region;
(c) the energy potential of the gate region is greater than the energy potential of the drain region; and
wherein a wall-confined bubble of the second fluid can be introduced into the capillary filled with the first fluid and the energy of the bubble can be increased sufficiently to cause the bubble to move from the gate region to the drain region due to the energy potential difference between the gate region and the drain region.

24. The device according to claim 1 wherein the source region is separated from the barrier region and the drain region and acts as a source of the first fluid which refills the gate region as the bubble moves from the gate region.

25. The device according to claim 1 wherein the drain region has proximate to the barrier region a portion wherein the energy potential decreases with increasing distance from the barrier region.

26. The device according to claim 1 wherein the first fluid is a liquid and the second fluid is a gas.

27. The device according to claim 1 further comprising a means for introducing a bubble into the gate region and a means for increasing the energy of the bubble in the capillary.

28. The device according to claim 27 wherein the means for introducing the bubble is separate from the means for increasing the energy of the bubble.

29. The device according to claim 27 wherein the means for introducing the bubble is the same as the means for increasing the energy of the bubble.

30. The device according to claim 27 wherein the means for introducing the bubble is the same as the means for increasing the energy of the bubble and increases the size of the bubble to overcome the difference in energy potentials between the gate region and the barrier region.

31. The device according to claim 27 wherein a gaseous-bubble generator is used for introducing the bubble.

32. The device according to claim 27 wherein the means for introducing the bubble introduces the bubble into the capillary by means selected from the group consisting of thermal, electrical, chemical, electrolytic, pneumatic, hydraulic, optical, inertial, ultrasonic, and microfluidic means.

33. The device according to claim 1 wherein such energy potentials are determined by capillary geometry variations with distance in the capillary, and in which the capillary wetting properties of both the first fluid and the second fluid are substantially constant with distance in the capillary.

34. The device according to claim 1 wherein such energy potentials are determined by variations in capillary wetting properties of the first fluid and the second fluid with distance in the capillary.

35. The device according to claim 1 further comprising multiple source regions.

36. The device according to claim 1 further comprising multiple barrier regions.

37. The device according to claim 36 wherein the energy potential of one of the barrier regions can be changed relative to the other barrier regions thermally.

38. The device according to claim 1 wherein the capillary further comprises an additional set of gate-barrier-drain regions downstream to the gate region, barrier region, and drain region.

39. The device according to claim 1 wherein the first fluid comprises a hydrophilic liquid, the regions having substantially rectangular cross sections and of substantially uniform height but differing widths, the gate region having a gate width, the barrier region having a barrier width less than the gate width, the drain region having a drain width greater than the gate width, the source region having a source width less than the barrier width, the device further comprising an electrical resistor heater adjacent to the gate region, whereby a wall-confined gas phase bubble which substantially fills the volume of the gate region can be created within the liquid by heating, and whereby the volume of the gas phase bubble can be increased to fill both the gate region and the barrier region and to intrude into the drain region, and whereby the volume of the gas phase bubble can be further increased to cause it to be siphoned from the gate region to the drain region.

40. The device according to claim 1 wherein in the capillary, one or more regions are in a different plane than the other regions.

* * * * *